US009369847B2

(12) United States Patent
Borghei

(10) Patent No.: US 9,369,847 B2
(45) Date of Patent: Jun. 14, 2016

(54) AD HOC FORMATION AND TRACKING OF LOCATION-SHARING GROUPS

(75) Inventor: Hooman Borghei, San Jose, CA (US)

(73) Assignee: Apple Inc., Cupertino, CA (US)

( * ) Notice: Subject to any disclaimer, the term of this patent is extended or adjusted under 35 U.S.C. 154(b) by 534 days.

(21) Appl. No.: 13/614,978

(22) Filed: Sep. 13, 2012

(65) Prior Publication Data

US 2013/0005362 A1 Jan. 3, 2013

Related U.S. Application Data

(63) Continuation of application No. 12/831,956, filed on Jul. 7, 2010, now Pat. No. 8,284,748.

(51) Int. Cl.
*H04L 12/28* (2006.01)
*H04W 4/08* (2009.01)
*H04W 4/02* (2009.01)
*H04J 1/16* (2006.01)

(52) U.S. Cl.
CPC ................ *H04W 4/08* (2013.01); *H04W 4/021* (2013.01)

(58) Field of Classification Search
USPC ......................................... 370/338, 252, 254
See application file for complete search history.

(56) References Cited

U.S. PATENT DOCUMENTS

| | | | |
|---|---|---|---|
| 6,323,846 B1 | 11/2001 | Westerman et al. | |
| 6,553,236 B1 | 4/2003 | Dunko et al. | |
| 6,570,557 B1 | 5/2003 | Westerman et al. | |
| 6,677,932 B1 | 1/2004 | Westerman | |
| 6,888,536 B2 | 5/2005 | Westerman et al. | |
| 7,353,034 B2 | 4/2008 | Haney | |
| 8,538,458 B2 | 9/2013 | Haney | |
| 8,831,653 B2 | 9/2014 | Fattal et al. | |
| 2002/0141560 A1* | 10/2002 | Khayatan et al. | ............. 379/219 |
| 2003/0100326 A1* | 5/2003 | Grube | ................... H04W 84/08 455/515 |
| 2007/0030824 A1 | 2/2007 | Ribaudo et al. | |
| 2007/0282678 A1 | 12/2007 | Dendi et al. | |
| 2008/0132252 A1 | 6/2008 | Altman et al. | |
| 2009/0005018 A1 | 1/2009 | Forstall et al. | |
| 2009/0100137 A1 | 4/2009 | Venkitaraman et al. | |
| 2009/0325603 A1 | 12/2009 | van Os et al. | |

(Continued)

FOREIGN PATENT DOCUMENTS

WO    WO 2008/095103 A2    8/2008

OTHER PUBLICATIONS

U.S. Appl. No. 13/754,093, filed Jan. 30, 2013, Haney.
US Patent and Trademark Office, Before the Patent Trial and Appeal Board, Declaration of Interference: Apple Inc. v. X One, Inc.; Patent Interference 106,000 (HHB), Paper No. 1, entered Mar. 28, 2014, 12 pages.

*Primary Examiner* — John Pezzlo
(74) *Attorney, Agent, or Firm* — Fish & Richardson P.C.

(57) ABSTRACT

Methods, systems, and computer-readable media for forming and tracking a location-sharing group are disclosed. The location-sharing group can be performed ad hoc without the assistance of a central server. A geofence can be defined that encloses the current locations of the participating devices in the location-sharing group. The geographic location of the location-sharing group as a whole can be tracked and provided to the participating devices in the location-sharing group. Group-level location-sharing can be enabled. Departure of a participating device from the location-sharing group can be detected based on the current location and the coverage radius of each device in the location-sharing group. Entry of points of interest into the geofence of the location-sharing group can be detected and notified to the participating devices in the location-sharing group.

18 Claims, 15 Drawing Sheets

(56) References Cited

U.S. PATENT DOCUMENTS

| | | | |
|---|---|---|---|
| 2010/0004005 A1 | 1/2010 | Pereira et al. | |
| 2010/0325194 A1* | 12/2010 | Williamson et al. | 709/203 |
| 2011/0045847 A1 | 2/2011 | Roin et al. | |
| 2012/0050033 A1 | 3/2012 | Westen | |
| 2013/0337789 A1* | 12/2013 | Johnson | H04W 4/02 455/414.1 |

OTHER PUBLICATIONS

US Patent and Trademark Office, Before the Patent Trial and Appeal Board, Standing Order, Paper No. 2, entered Mar. 8, 2011, 83 pages.

US Patent and Trademark Office, Before the Patent Trial and Appeal Board, Order—Motion Times: Apple Inc. v. X One, Inc.; Patent Interference 106,000 (HHB), Paper No. 3, entered Mar. 28, 2014, 9 pages.

* cited by examiner

AD HOC FORMATION AND TRACKING OF LOCATION-SHARING GROUPS

CROSS REFERENCE TO RELATED APPLICATION

This application is a continuation of U.S. application Ser. No. 12/831,956, filed Jul. 7, 2010, the entire disclosure of which is incorporated herein by reference.

TECHNICAL FIELD

This subject matter is generally related to location-sharing for mobile devices.

BACKGROUND

Some mobile devices include a positioning system, such as a Global Positioning System (GPS), to determine a user's current geographic location and display a map showing a marker for the user's current geographical location. As the user moves to a different location, the positioning system recalculates the current location of the user, and refreshes a displayed map to reflect the updated location of the user.

Some mobile devices also allow location-sharing among users who have agreed to become "location-sharing friends" with one another. For example, two users can register with a location information server and agree to share their geographical locations with each other. The location information server maintains a database of location information submitted by the respective mobile devices associated with the two users. The location information server will forward the location information of one user to the other user either upon request, on a schedule, or upon receiving a submission of a location update. Each user can view the location-sharing friend's location on a map displayed on the user's own mobile device.

SUMMARY

Systems, methods, and computer-readable media for collecting location information update are disclosed.

In one aspect, a method includes: detecting formation of a location-sharing group between two or more mobile devices; defining a geofence around the location-sharing group, the geofence encloses respective current geographic locations of the two or more mobile devices; tracking a geographic location of the location-sharing group and a geographic coverage of the geofence around the location-sharing group; and providing the geographic location of the location-sharing group to at least one of the two or more mobile devices in the location-sharing group.

Other embodiments of this aspect include corresponding systems, apparatus, and computer programs, configured to perform the actions of the methods, encoded on computer storage devices.

These and other embodiments can optionally include one or more of the following features.

In some implementations, the action of detecting formation of the location-sharing group further includes: receiving a group initiation request from a host device, the host device being one of the two or more mobile devices in the location-sharing group, and the group initiation request identifying the location-sharing group to be formed and one or more participating devices that have been invited to join the location-sharing group; and subsequent to receiving the group initiation request, receiving a notification from the host device indicating that the location-sharing group has been formed, wherein the notification includes respective consents from the one or more participating devices to join the location-sharing group.

In some implementations, the action of detecting formation of the location-sharing group further includes: receiving a group invitation request from a host device, the host device being one of the two or more mobile devices in the location-sharing group, and the group initiation request identifying the location-sharing group to be formed and one or more participating devices that have been invited to join the location-sharing group; and subsequent to receiving the group initiation request, receiving from each of the participating devices a respective consent to join the location-sharing group.

In some implementations, the location-sharing group is supported by one or more active network connections between the two or more mobile devices. In some implementations, the one or more network connections include one or more of a Bluetooth network connection or a WiFi network connection.

In some implementations, the action of defining a geofence around the location-sharing group further includes: determining the respective current geographic locations of the two or more mobile devices; determining a respective coverage radius for each of the two or more mobile devices; determining a boundary of a combined coverage area that encloses the current geographic location of each mobile device by a distance equal to the coverage radius for the mobile device; and using the boundary of the combined coverage area as the geofence around the location-sharing group.

In some implementations, the action of determining the respective coverage radius for each of the two or more mobile devices further includes: determining a connection type for a network connection presently established between the mobile device and another mobile device in the location-sharing group; and using a known connectivity range for the connection type as the coverage radius for the mobile device.

In some implementations, the action of determining the coverage radius for each of the two or more mobile devices further includes: receiving the coverage radius from the mobile device, the coverage radius being a user-specified distance.

In some implementations, the action of tracking the geographic location of the location-sharing group and a geographic coverage of the geofence around the location-sharing group further includes: monitoring the current geographic locations of the two or more mobile devices; determining a current boundary of the combined coverage area that encloses the current geographic location of each mobile device by at least the coverage radius of the mobile device; updating the geofence around the location-sharing group based on the current boundary of the combined coverage area; and determining an updated geographic location for the location-sharing group based on the updated geofence around the location-sharing group.

In some implementations, the geographic location of the location-sharing group is based on a geometric center of the geofence around the location-sharing group.

In some implementations, the method further includes: determining the current geographic locations of the two or more mobile devices; determining a respective coverage radius for each of the two or more mobile devices; detecting that at least one of the two or more mobile devices is outside of the coverage radius of all other mobile devices in the location-sharing group; and notifying the two or more mobile devices in the ad hoc network about the departure of the at least one mobile device from the location-sharing group.

In some implementations, the geographic location and geofence of the location-sharing group are based on the mobile devices that are currently participating in the location-sharing group.

In some implementations, the method further includes: providing a suggested route for the departed mobile device to rejoin the location-sharing group.

In some implementations, the method further includes: providing a suggested route to at least one of the mobile devices currently participating in the location-sharing group to recapture the departed mobile device.

In some implementations, the method further includes: detecting that a point of interest has crossed and entered the geofence of the location-sharing group; and providing a notification to at least one of the two or more devices about the point of interest.

In some implementations, the point of interest is a location of interest, and the method further includes: storing a plurality of candidate locations of interest; monitoring the relative positions between each candidate location of interest and the geofence that encloses the current geographic locations of the two or more mobile devices; and determining that at least one of the candidate locations of interest has crossed and entered the geofence based on the relative positions between the candidate location of interest and the geofence.

In some implementations, the point of interest is a device of interest, and the method further includes: detecting a candidate device of interest, the candidate device of interest having an associated location; monitoring the relative positions between the candidate device of interest and the geofence that encloses the current geographic locations of the two or more mobile devices; and determining that the candidate device of interest has crossed and entered the geofence based on the relative positions between the candidate device of interest and the geofence.

In another aspect, a method includes: detecting formation of an ad hoc network between two or more mobile devices; defining a geofence around the ad hoc network, the geofence encloses respective current geographic locations of the two or more mobile devices; tracking a geographic location of the ad hoc network and a geographic coverage of the geofence around the ad hoc network; determining that a point of interest has entered the geofence; and notifying at least one mobile device in the ad hoc network about the point of interest.

Other embodiments of this aspect include corresponding systems, apparatus, and computer programs, configured to perform the actions of the methods, encoded on computer storage devices.

These and other embodiments can optionally include one or more of the following features.

In various implementations, the methods and systems disclosed in this specification may offer one or more of the following advantages.

For example, an ad hoc network can be formed between individual devices through various pairing mechanisms, such as a Bluetooth or Wi-Fi pairing mechanism. The formation of the ad hoc network does not need to involve the cumbersome request, consent, and confirmation process facilitated by a central server. After the ad hoc network has been formed, a location information server can be notified of the existence of the ad hoc network and the identities of participating mobile devices of the ad hoc network. The location information server can immediately start tracking the current location of each participating mobile device and the current location of the ad hoc network as a whole. The location information server can also immediately supply the current location of each participating mobile device and the current location of the entire ad hoc network to all participating mobile devices in the ad hoc network.

With such a light-weight setup process for location-sharing among a group of users, each user can easily set up and terminate temporary and special purpose location-sharing groups. The light-weight setup and termination processes can encourage users to utilize location-sharing more actively, while alleviating the users' concerns that their locations are being tracked constantly for no particular compelling reasons.

In addition, when the location of an ad hoc location-sharing group is tracked as a whole, the location of the entire group can be shared with another device or another location-sharing group in real-time. In some situations, only the current location of the entire group is pertinent and the locations of individual participating devices within the group are not. In such situations, presenting only the current location of the group as a whole in a map displayed on a device can help reduce the visual clutters on the map and conserve transmission bandwidth used for the location-sharing.

A geofence can be defined based on the respective current location and the respective coverage radius of each participating mobile device of the ad hoc location-sharing group. The location of the ad hoc group as a whole can be determined based on the geometric center of the geofence, for example. The location of the ad hoc group as a whole takes into account the current locations of all participating devices in the group. Therefore, the determined location of the group is not biased toward the location of any particular device.

The geofence of the entire group can also be used to determine whether a participating device of the group is departing from the group and generate an alert to the participating device and/or other devices in the ad hoc location-sharing group. In some cases, routes can be provided for the departing device to rejoin the group or for the rest of the group to catch up with the departing device. This feature can be helpful in many situations to keep a group together, or to locate a lost user or device.

The geofence can also be used detect points of interest that the group as a whole can conveniently travel to. This feature can allow impromptu visits to a location of interest based on the current location of the group as a whole. In some instances, the users of those devices closest to the point of interest can reach the point of interest first and inform the rest of the group whether the place is indeed worth visiting before the rest of the group spends the time and efforts to get there.

In some implementations, the geofence can be used to detect devices of interest that have come near the group as a whole. This feature can help improve security around the location-sharing group by detecting unauthorized users near the group. This feature can also help alert the users when certain people or vendors who are on the move come near the group.

The details of one or more embodiments of the subject matter described in the specification are set forth in the accompanying drawings and the description below. Other features, aspects, and advantages of the subject matter will become apparent from the description, the drawings, and the claims.

DETAILED DESCRIPTION

Location-Sharing Among Location-Aware Mobile Devices

Figure 1A:
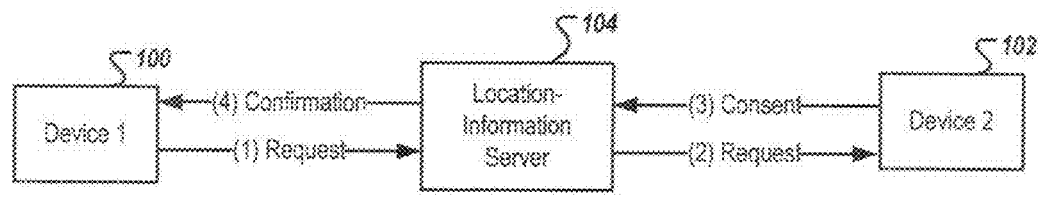
FIG. 1A is a block diagram illustrating an example process for setting up a location-sharing group through a central server.

The location of a user can be determined through a location-aware mobile device associated with the user. For example, the location-aware mobile device can be a mobile device that the user is carrying on his or her person. Each location-aware mobile device can be associated with a user through an identifier (e.g., a cellular phone number, an email address, a user ID, etc.) that the user is using for logging onto a particular network or internet service through the location-aware mobile device.

A location-aware mobile device includes circuitry and sensors for supporting a positioning capability, such as that provided by the global positioning system (GPS). For example, a GPS module or an assisted GPS (A-GPS) module can provide a location of the mobile device in terms of latitude and longitude coordinates.

In addition, a locator module running on the mobile device can utilize the GPS module and/or other components of the mobile device for positioning. For example, the locator module can invoke a cellular phone component, a WiFi component, a television receiver component, or a radio receiver component on the mobile device to scan for nearby fixed transmitters or signal sources. When signals are received by the mobile device from one or more signal sources with known fixed locations, such as the cellular grids, wireless access points, and radio and TV broadcast towers, the location of the mobile device can be determined to various degrees of precision based on various techniques (e.g., triangulation).

Other positioning systems and technologies can be implemented on, or coupled to the mobile device to allow the mobile device to self-locate. In some implementations, precision of location determination can be improved to include altitude information. In some implementations, the precision of location determination can be improved. For example, a user's exact location may be determined within building structures using sonar technologies. In such implementations, building structure information may be obtained through a server of such information.

A user of a location-aware mobile device can share his or her location with users of other location-aware mobile devices through a location-information server. A group of users (e.g., at least a pair of users) can sign up for a location-sharing service, and notify the location-information server of their willingness to share locations with one another. The group of users who have signed up to share locations with one another are deemed as a group of location-sharing "friends." The personal relationship between location-sharing friends can encompass social, business, professional, temporary associations, familial, and so on. The respective location-aware mobile devices associated with each of the location-sharing friends are "location-sharing friend devices" or "friend devices" of one another. Each user can set up multiple groups of location-sharing friends, and manage his or her location-sharing with each group individually.

The location-sharing mobile devices can determine their respective locations and submit updates of their respective locations to the location-information server. The location-information server can maintain a database of the submitted location information and can provide the location information of a mobile device to the friend devices of the mobile device. In some implementations, the location-information server can provide the location information upon request by the friend device(s), upon receiving an update of location information from the location-aware mobile device, and/or according to a predetermined schedule (e.g., every 5 minutes).

The location information of location-sharing friends and their associated friend devices can be presented and utilized in various applications on a location-sharing mobile device. For example, icons of the location-sharing friend devices can be superimposed on a map displayed on the location-sharing mobile device, indicating the current locations of the location-sharing friend devices. As the current locations of the friend devices are updated, the user of the location-sharing mobile device can see the icons move accordingly on the map. In some implementations, the user can also place its own icons on the same map. Sometimes, a dedicated location-sharing application can be implemented to manage location-sharing and review location information of the location-sharing friends.

In conventional location-sharing applications, setting up location-sharing between two users or a group of users requires a request, acceptance, and confirmation process that is facilitated by a central server (e.g., the location-information server). For example, each user has to submit a request to the central server identifying one or more other users that he or she wishes to share their locations with. The central server forwards the user's request to the other users and waits for a reply from each of the other users. When each of the other users has responded to the central server to accept the location-sharing request, the central server then forwards a confirmation to the requesting user about the acceptance. After this process is completed, the central server can start tracking the location of each location-sharing device, and forward the location information of each device to the other location-sharing devices in the group, either upon subsequent request or periodically.

The conventional process for setting up a location-sharing group is cumbersome and can take a long time. This convention process is not suitable for ad hoc purposes. For example, if several users run into one another at one location by chance and decide to travel together to another location in separate vehicles, it is desirable to form an ad hoc location-sharing group among these users so that the users can travel in close proximity to one another toward their destination. If one of the users gets off-track, others in the group can alert and help that user get back on track. In such a scenario, it is inconvenient and time consuming to set up the location-sharing using the conventional request, acceptance, and confirmation process because each user would have to either send a request to or respond to requests from all other users in the group through the central server.

In addition, although it is possible to set up the location-sharing group beforehand for some special events, some users may be reluctant to do so, since they may not want to have their locations tracked during times before and after the special events. Even if a user were allowed to temporarily disable location-sharing with particular location-sharing friends, this would only prevent the user's location from being disclosed to those location-sharing friends, but not prevent the user's location being tracked by the location-information server.

Therefore, it is desirable to have an easy and fast way to set up an ad hoc location-sharing group, such that the users can set up location-sharing at the time such sharing is needed and terminate the location tracking completely after the purpose for location-sharing has been served.

Establishing an Ad Hoc Location-Sharing Group

To establish location-sharing among a group of users, the location-information server needs to obtain consent from each participating user for tracking the location of the user and sharing the location information of the user with other users in the group.

Conventionally, the location-information server obtains such consents by serving as the intermediary for transmitting the request and the acceptance for location sharing between each pair of users in the group. For example, as shown in FIG. 1A, when a user of device 100 wishes to form a location-sharing group with another device 102, a four-step process must be performed: (1) device 100 sends a location-sharing request to the location-information server 104 identifying device 102; (2) the location-information server 104 forwards the request to device 102; (3) device 102 responds to the location-information server 104 indicating consent to the location-sharing with device 100; and (4) the location-information sever 104 forwards a confirmation to device 100 indicating the acceptance from device 102. After the four-step setup process, the location-information server 104 establishes the location-sharing group between device 100 and device 102, and starts tracking and sharing the locations of the two devices. To set up a group including more than a pair of devices, the same four-step process can be performed between each pair of devices in the group.

The conventional process for forming a location-sharing group can be time-consuming and cumbersome, and is often unsuitable for ad hoc purposes. Various improved processes are disclosed in this specification, where the consent-gathering can be performed by a user device without the help of the central server (e.g., the location-information server), leading to faster and easier formation of a location-sharing group.

For example, to gather the consent for location-sharing for an entire group of users, one user in the group can server as a host and contacts other users in the group directly (e.g., without involving the location-information) to obtain their consents to join the location-sharing group. The host can communicate the invitation for joining the location-sharing group to other users through various available means, e.g., face-to-face communication, short-range wireless communications, SMS, or email, telephonic communication, Voice over IP (VoIP) communication, and so on. The invited users who wish to join the group can provide his or her consent by performing a predetermined pairing action on his or her mobile device, where the pairing action does not involve the central server (e.g., the location-information server).

In some implementations, the pairing action includes, for example, sending a required passcode to a host device (e.g., a location-aware mobile device used by the host user), sending a consent email or SMS message to the host device, forming a short-range network connection with the host device, and so on. Other pairing actions can be defined. For example, movement of an invited device (e.g., a location-aware mobile device used by an invited user) according to a predetermined pattern, tapping the invited device according to a particular rhythm, and so on, can also be used as the pairing event indicating a user's consent to join the location-sharing group.

Once the host device receives the consents from the entire group of invited devices, the host device can notify the location-information server that an ad hoc location-sharing group has been formed. The notification can include the consents collected from each participating device in the location-sharing group and the identities (e.g., respective device or user identifiers) of the location-sharing devices in the group.

Figure 1B:
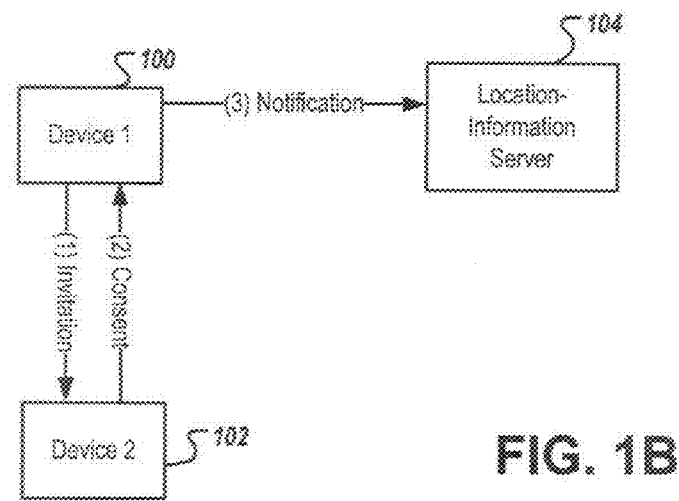
FIGS. 1B and 1C are block diagrams illustrating the formation of an ad hoc location-sharing group.

As illustrated in FIG. 1B, the process for setting up an ad hoc location-sharing group only involves three steps: (1) device 100 (host) sends an invitation to device 102; (2) device 102 provides consent to join the location-sharing group to device 100; and (3) device 100 notifies the location-information server of the formation of the location-sharing group between device 100 and device 102.

In this three-step process, the invitation can be provided in person (e.g., verbally) by the user of the host device 100 to the user of the invited device 102. The notification sent to the location-information server 104 can include an identifier of the location-sharing group, identifiers of the host device 100 and the participating device(s) 102, as well as the consents from the users for joining the location-sharing group. If more than two users are invited to join the location-sharing group (e.g., verbally or by one or more SMS or email messages), the invited users can perform the pairing action simultaneously or serially.

Once the location-information server 104 receives the notification from the host device 100, the location-information server 104 can start tracking the location of each device in the location-sharing group, and forward the location information of each device to other devices participating in the location-sharing group.

In some implementations, a dedicated location-sharing application can be implemented to manage location-sharing and review location information of the location-sharing friends and/or friend devices. The location-sharing application can be implemented to include the functions for gathering and providing consents for location-sharing groups. For example, the location-sharing application can include an interface for initiating a location-sharing group, defining the predetermined pairing event, collecting the consents from the invited devices, and for reporting the formation of the location-sharing group to the location-information server.

In one example scenario, a group of users meet at a first location and decide to depart and meet again at a second location shortly thereafter. Prior to departure, one of the users (e.g., a host user) can verbally suggest that an ad hoc location-sharing group be formed for this trip to ensure safe and timely arrival of everyone in the group at the second location. Everyone in the group can respond by performing a predetermined pairing action using his or her own location-aware mobile device as instructed by the host user.

In some implementations, the pairing event can be performed by forming a short-range wireless connection between the host device and an invited device. The host device can serve as a base station or master device for a short-range wireless network, and each invited device can form a short-range network connection to the host device through particular network protocols.

For example, the host device can serve as a Bluetooth master device, and each invited device can connect to the master device according to the Bluetooth communication protocol. For another example, the host device can serve as a Wi-Fi network base station, and each invited device can connect to the host device according to various Wi-Fi supported network protocols. Other connection mechanisms can be used, such wireless USB, Digital Enhanced Cordless Telecommunications (DECT), and so on.

In some implementations, a one-to-one connection can be formed between each invited device and the host device. In some implementations, the connection between an invited device and the host device can be bridged by another invited device that has already formed a connection to the host device. For example, as in a Bluetooth network, one master device may communicate with up to 7 slave devices in a piconet (i.e., a network of 8 devices). In some implementations, two or more piconets can be joined together to form a scatternet, with some devices acting as a bridge by simultaneously playing the master role in one piconet and the slave role in another.

In some implementations, the short-range wireless network connection can be established automatically, when the invited device is brought within a predetermined range of the host device. In some implementations, the invited device can submit a link key to the host device in order to be connected to the host device. When the invited device correctly provides the link key to the host device, the pairing event is completed and the consent from that invited device can be registered by the host device.

In some implementations, the link key can be made known to the invited users by the host user through various means. For example, if the link key is a passcode formed of numbers and/or letters, the link key can be provided by the host user to the invited users through verbal communication or by writing in an SMS or email message. The invited users can provide his or her consent to join the location-sharing group by entering the passcode through a user interface on their respective devices (i.e., the invited devices) and send the passcode back to the host device.

In some implementations, the link key can be a predetermined or host-defined movement pattern or rhythm. The host user can provide a physical demonstration (e.g., by moving the device according to a movement pattern, tapping the device according to the rhythm, etc.) of the link key, and the other users in the group can move their respective devices in the same manner to indicate their consent to join the location-sharing group. In some implementations, the movement of the host device and the invited devices can be synchronized in order for the host device to register the consent. Since the pairing events can be performed at or around the same time by multiple invited devices, an ad hoc location-sharing group of multiple devices can be formed easily and quickly.

Once the host device receives and registers the consent from each invited device in the group, the host device can create a notification message indicating the formation of the ad hoc location-sharing group. The notification message can include an identifier for the location-sharing group. The notification message can also include an identifier and a certificate of consent from each participating device (e.g., including the host device and the invited devices that have provided consents) in the location-sharing group. The notification message can be sent by the host device to the location-information server, e.g., through an HTTP interface of the location-information server.

In some implementations, when the location-information server receives the notification message from the host device, the location-information server can create a new entry in a location-sharing group database for the newly formed location-sharing group as identified in the notification message. The location-information server can also start to track the current locations of the mobile devices identified in the notification message immediately.

In some implementations, any device in the location-sharing group can assume the role of the host device, for example, by executing the location-sharing application in a host mode. In some implementations, when several location-aware mobile devices executing the location-sharing application are brought in close proximity to one another, the host device can automatically selected from the group of devices according to one or more predetermined criterion, such as a wireless capability requirement, an authority level requirement, and so on.

In some implementations, a host device can initiate a location-sharing group by sending out an invitation to other devices to join the group. Instead of collecting the consents from all of the invited devices and forwarding the consents to the location-information server, the host device simply can send a notification to the location-information server for establishing such a location-sharing group and each invited device can send in a respective consent to the location-information server directly. Optionally, the invited device can also send a reply to the host device indicating the acceptance of the invitation.

Figure 1C:
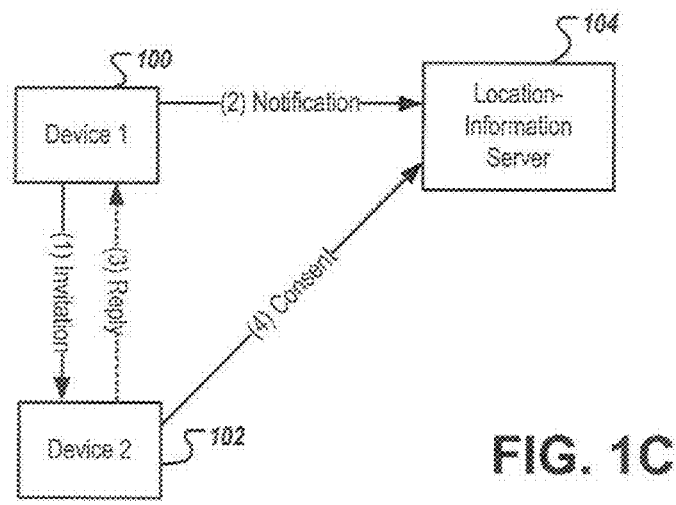

For example, as shown in FIG. 1C, an example process for setting up a location-sharing group between device 100 and device 102 includes: (1) device 100 (host) sends an invitation to device 102; (2) device 100 also sends a group initiation notification to the location-information server 104; (3) in response to the invitation, device 102 optionally sends a consent to join the location-sharing group to the device 100; and (4) device 102 sends a consent to the location-information server 104 for joining the location-sharing group.

In some implementations, step (1) and/or step (3) of the above example process can be accomplished by the users of the devices 100 and 102 in person (e.g., verbally), and need not involve the devices 100 and 102. In some implementations, the invitation to device 102 and the group initiation notification to the location-information server 104 can include the same content. For example, the invitation and the group initiation notification can include an identifier of the host device and/or the location-sharing group. In some implementations, the group initiation notification can further include the consent from the host device and the identifier(s) for the invited device(s). In some implementations, the invitation and the group initiation notification can be sent out by the host device simultaneously. In some implementations, the invitation and the group initiation notification can be sent at different times.

In some implementations, if the host user wants to invite multiple users to the location-sharing group, the host user can cause the host device to broadcast the invitation, and all location-aware mobile devices within a specified range of the host device would be able to receive the invitation and respond to the invitation. When responding to the host device and the location-information server, each invited device can include the group identifier and/or the host identifier of the location-sharing group specified in the invitation along with the consent to join the group in the notifications sent back to the host device and the location-information server.

In some implementations, the location-information server can establish a location-sharing group as soon as the group initiation request is received from the host device and before the responses from the invited devices are received. For example, a new database entry for the location-sharing group can be created by the location-information server as soon as the group initiation request is received. When the consents to join the location-sharing group from the invited devices are subsequently received from the invited devices, the location-information server can update the database entry to include the newly added group member devices.

In some implementations, the group initiation request can include a parameter that specifies a limited duration (e.g., 5 minutes) in which invited devices can be added to the location-sharing group. In some implementations, the location-sharing group can be open for subscription for an indefinite period of time (for example, until the host sends a termination message to the location-information server or until a threshold number of users have accepted to join the group).

Location-Sharing within the Ad Hoc Location-Sharing Group

After the location-information server receives notifications from the host device and/or each individual invited device indicating their respective consent to join the location-sharing group, the location-information server can start tracking the locations of each participating device in the group (including the host device and the invited devices that have provided consents).

Each participating device can periodically report its own current location to the location-information server, and the location-information server can send the updated location information for each participating device to other devices in the location-sharing group, either periodically (e.g., every minute), upon receipt of an update in location, or upon request. In some implementations, the location-information server can poll each location-sharing device in the group periodically (e.g., every minute) to obtain the location update. In some implementations, the location-information server can request data from the participating device that can be used to calculate the current location of the device.

The location-information server can maintain a location information database and provides the location information of each participating device to other participating devices in the location-sharing group. To provide up-to-date information, the location information server can require the participating devices to submit updates of their own locations. In some implementations, each participating device can implement a background process that periodically determines and submits the device's own location to the location-information server. In some implementations, the background process can periodically determine the mobile device's own location and submits location updates to the location-information server if a significant change in location has occurred.

In some implementations, each device can include a software application that displays the location information of the devices participating in the location-sharing group on a map. In some implementations, the location information can be displayed in textual form.

Figure 2A:
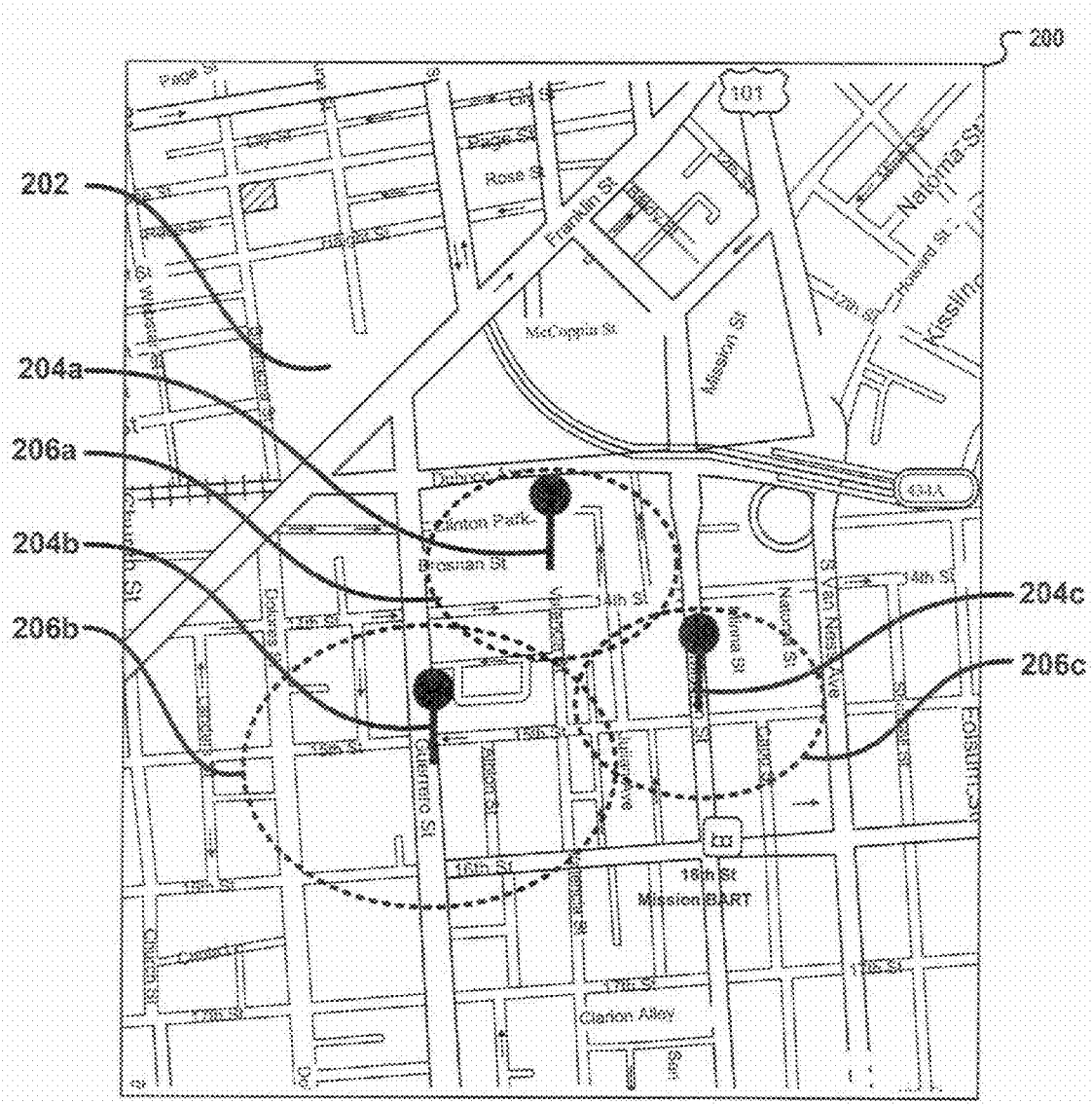
FIG. 2A is an example user interface showing the locations of participating devices in an ad hoc location-sharing group.

FIG. 2A is an example user interface that displays the current locations of each participating device in an ad hoc location-sharing group. In this example, a street map 202 is displayed in a user interface 200. The street map 202 can be any map showing roads, streets, and/or paths in an area. For example, the street map 202 can be an aerial photograph of the area represented, a road atlas, a regular map showing city streets and roads, a map showing the grounds of a facility or building, or a map showing key landmarks. The map can also be displayed according to different zoom levels specified by a user.

A marker 204 (e.g., in the form of a push pin) for each participating device in the location-sharing group can be displayed on the map 202. Currently, three markers (e.g., 204a-c) are shown in FIG. 2A. The location of the marker 204 on the map 202 represents the currently known location of the participating device. As the location of each participating device changes, the location-information server provides an updated location to other participating devices in the location-sharing group, and the location of the maker representing the moving device is updated to reflect the current location of the moving device.

In some implementations, the user interface 200 can also present an identifier for each marker 204 to indicate the identity of the user associated with the device represented by the marker 204. In some implementations, the identifier for each marker 204 can be hidden and only presented when a user invokes the marker 204 using a pointing device (e.g., a mouse pointer or the user's finger on a touch-sensitive surface coupled to the user's device).

In some implementations, if a user device is participating in multiple location-sharing groups, the participating devices in each different location-sharing group can be indicated using a different kind of marker (e.g., having a different color or shape) on the map 202 in the user interface 200. In some implementations, different maps can be used in the user interface 200 to show the locations of the devices in each location-sharing group. In some implementations, each user's own marker can be shown in the map with a special effect or look to distinguish from other participating devices in the same location-sharing group. In some implementations, the host device can be shown with a special effect or look to distinguish from other participating devices in the same location-sharing group.

Tracking and Sharing the Location of an Ad Hoc Location-Sharing Group

In some implementations, in addition to the information about the current location of each participating device in a location-sharing group, the location-information server can also determine the location of the location-sharing group as a whole. The location of the location-sharing group as a whole can be provided to each participating device in the location-sharing group. In some implementations, the location of the group as a whole can also be provided to other devices not currently participating in the location-sharing group, provided that consents for such sharing has been obtained from the participating devices in the location-sharing group. In some implementations, location-sharing among two or more groups can be enabled, as well.

In some situations, the exact locations of individual members of a location-sharing group are less pertinent than the location of the group as a whole. For example, during a search and rescue mission that involves several teams of rescuers, each team can form their own ad hoc location-sharing group. Within each location-sharing group, participating members can share their own locations and keep track of the locations of other members in the same group. Location-sharing between groups can also be enabled, such that each search team can share the team's own location and keep track of the locations of other search teams. This group-level location-sharing can ensure adequate coverage of the search area and avoid unnecessary overlap of the search efforts between search teams, for example. In some implementations, the consents for group-level location-sharing can be exchanged between the hosts of the location-sharing groups, and notified to the location-information server.

In some implementations, in order to determine the location of a location-sharing group as a whole, a geofence can be defined for the location-sharing group based on the current locations of the participating devices in the location-sharing group. A geofence of a location-sharing group is the boundary of an area that encloses the respective location of each participating device in the location-sharing group by at least a coverage radius of the participating device. A coverage radius of a device is a parameter that can be used to describe the range that a user of the device is able to maintain a desired level of communication with another user or device in the group.

In some implementations, different geofences can be defined for a location-sharing group depending on the definitions of the coverage radius for each participating device. In some implementations, various techniques can be used to refine the shape and size of the geofence such that the geofence best approximates the shape and size of the area that is covered by the members of the location-sharing group.

In some implementations, the coverage radius of a device can be determined according to the distance range of the type of network connections (e.g., Bluetooth connection or WiFi connection) that the device can maintain with another device in the location-sharing group. In some implementations, the coverage radius of a device can be determined based on the distance range of the type of communications (e.g., voice, visual, or gestural communications) that a user of the device wishes to maintain with another user in the location-sharing group.

For example, if the devices within the location-sharing group communicate with each other through Bluetooth connections, the coverage radius of each device can be the distance range within which the Bluetooth communication can be maintained between the devices. For example, two class 1 Bluetooth devices can maintain a connection within a distance of approximately 100 meters; and two class 2 Bluetooth devices can maintain a connection within a distance of approximately 10 meters. Therefore, the coverage radius of a class 1 Bluetooth device can be set to 50 meters, while the coverage radius of a class 2 Bluetooth device can be set to 5 meters, for example.

For another example, if two users within the location-sharing group would like to keep their distance within visual range, the two users can specify such preference to the location-information server (e.g., in the consent notification sent to the location-information server) and the coverage radius of each user can be set to a value appropriate for maintaining visual contact given the geographic conditions of the user's current locations. For example, when the users are in a plain area, the coverage radius can be greater than when the users are in a hilly area. For another example, the coverage radius can be smaller when the users are in a crowded area (e.g., downtown or a theme park) than when the users are in a quiet area (e.g., a neighborhood park).

In some implementations, the coverage radius of each device in a location-sharing group can be specified by the users of the device and provided to the location-information server (e.g., in a consent notification sent to the location-information server). For example, when a family goes together to a theme park, each family member can carry a location-aware mobile device and form a location-sharing group. The parents within the family can specify a greater coverage radius for themselves than the children within the family can specify for themselves. For example, the parents can specify a coverage radius of 20 meters for themselves, while each child within the family can only specify a coverage radius of 5 meters for him or herself.

In some implementations, the coverage radius associated with each device can be increased based on other communication capabilities each user has, for example, with the assistance of other communication devices that the user is carrying on his or her person. Continue with the example above, if two or more family members also each carries a walkie-talkie, which enable these family members to maintain voice communication over a greater distance (e.g., 30 meters). Then, these family members that carry the walkie-talkies can specify a coverage radius of 30 meters with respect to one another, and specify a smaller coverage radius (e.g., 20 meters or 5 meters) with respect other members that do not carry a walkie-talkie.

In some implementations, the coverage radius of each participating device can be indicated on the map showing the current locations of the participating devices in the location-sharing group. For example, as shown in FIG. 2A, a circular perimeter 206 (e.g., each of circles 206a-c) is drawn around each marker 204 (e.g., each of markers 204a-c) that represents the current location of a respective participating device in the location-sharing group. The radius of the circular perimeter 206 is the coverage radius for the participating device 204 indicated inside the circular perimeter 206. In some implementations, the user interface 200 can also provide information on the value of the coverage radius for each device, as well as the type of network connections and/or communication means that are used to determine the coverage radius.

Figure 2B:
FIGS. 2B-2C are example user interface showing the geofence around the location-sharing group and the current location of the location-sharing group.

In some implementations, once the current location and the coverage radius of each participating device within the location-sharing group are known to the location-information server, the location-information server can determine the geofence of the entire location-sharing group accordingly. For example, as shown in FIG. 2B, the current locations of each participating device in a location-sharing group is indicated by a respective marker 204 (e.g., each of 204a-c) on a map 202. The coverage area of each device (as indicated by each of markers 204a-c) is also indicated on the map 202 (e.g., by a respective one of circles 206a-c having a radius equal to the coverage radius of the device). The geofence 208 is shown on the map 202 as well, where the geofence 208 encloses the current locations of all participating devices in the location-sharing group.

In some implementations, the geofence around the location-sharing group can be defined to be the convex hull of the combined coverage area of the participating devices (e.g., a smallest convex shape that enclose all of the participating devices by at least the coverage radius of the device). As shown in FIG. 2B, the geofence 208 encloses the locations of the participating devices by at least the coverage radii of the devices.

In some implementations, the geofence of a location-sharing group can be defined to be the minimum convex hull that encloses the current locations of all participating devices in the location-sharing group. In some implementations, the geofence of the location-sharing group traces the outer boundary of the combined coverage area of all participating devices in location-sharing group. In some implementations, the geofence can enclose an area slightly bigger or smaller than the combined coverage area of the participating devices by a user-specified or system-specified amount.

In some implementations, the geofence data can be provided to each participating device in the location-sharing group by the location-information server, and be displayed on the map shown on the participating device. In some implementations, the geofence can be computed by a software application executing on each participating device based on the location and coverage radius information of all participating devices received from the location-information server.

As one or more participating devices in the location-sharing group move around, the current locations of these devices are updated at the location-information server. The location-information server can compute an update to the geofence based on the updated current locations of the participating devices. As the participating devices moves around, the shape and size of the geofence can vary accordingly.

Figure 2C:
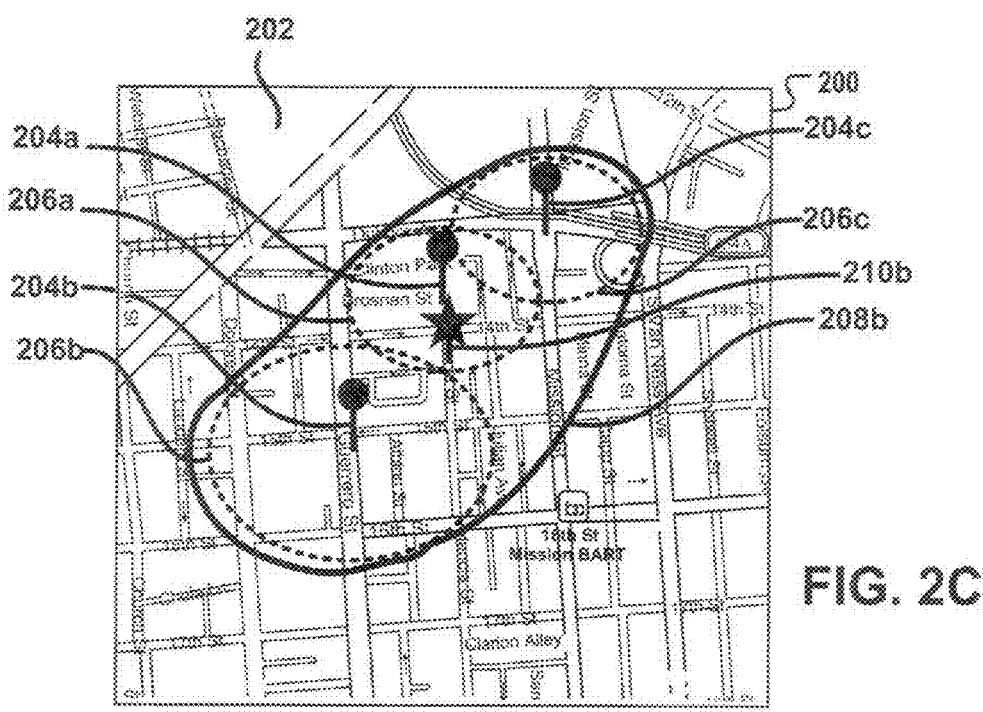

For example, as shown in FIG. 2C, one of the participating devices (e.g., device represented by marker 204c) has moved from a first location shown in FIG. 2B to a second location shown in FIG. 2C. On a user interface shown on each participating device, the map 202 can show the current locations of all three participating devices (as indicated by the markers 204a-c), and their respective coverage areas (as indicated by the circles 206a-c). In addition, the geofence 208 is stretched and reshaped (e.g., from 208a to 208b) to enclose the locations of all of the participating devices by at least the coverage radius of each device.

In some implementations, in addition to the geofence, the location for the location-sharing group as a whole can be determined and presented on the map interface shown on each participating device of the location-sharing group. For example, as shown in FIG. 2B and FIG. 2C, a special marker 210 (e.g., a star-shaped push pin 210a and 210b) can be displayed on the map 202 to indicate the location of the location-sharing group as a whole.

In some implementations, the location of the location-sharing group can be a geometric center of the geofence determined for the location-sharing group. In some implementations, the location of the location-sharing group can be slightly biased toward the host device of the location-sharing group. As one or more devices within the location-sharing group moves around, the geofence can change its shape, size, as well as its overall location based on the current locations of the participating devices in the location-sharing group. As indicated in FIG. 2B and FIG. 2C, the overall location of the location-sharing group moves slightly toward the upper right direction after one of the participating devices (e.g., device represented by the marker 204c) moved to the upper right corner of the map 202 while other device remained stationary. If all of the participating devices moved in a general direction, the location of the entire group would move in that general direction as well.

In some implementations, the location of the location-sharing group as a whole can be provided to another device (e.g., a group monitoring station) that is not currently participating in the location-sharing group. For example, in a search and rescue mission involving multiple search teams, each search team includes multiple members that form a location-sharing group. Each location-sharing group as a whole can authorize that the group location can be provided to a monitoring device, such as a computer at the rescue command center.

Figure 2D:
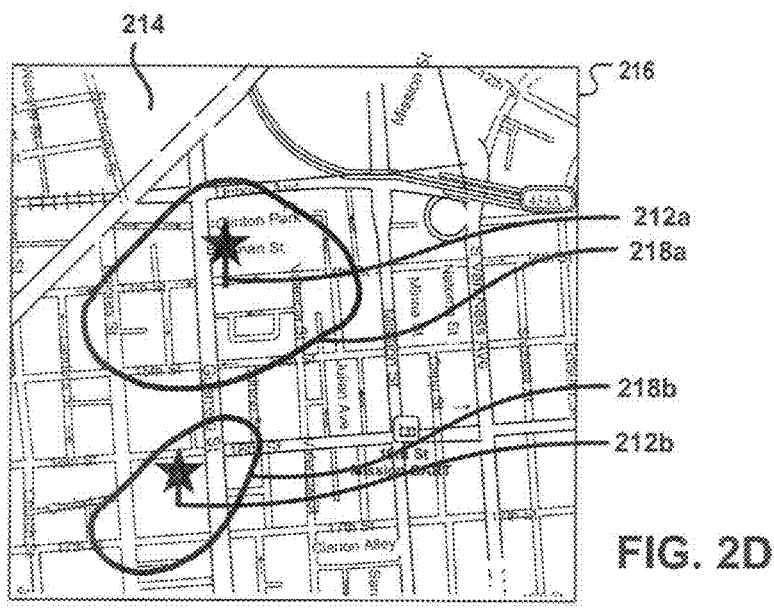
FIGS. 2D-2E are example user interfaces showing location information on a group-level.

For example, as shown in FIG. 2D, the location of each location-sharing group can be indicated (e.g., with a star-shaped push pin 212a and 212b) on a map 214 shown on an interface 216 of the monitoring device. In some implementations, the geofence 218 for each location-sharing group can be presented on the map 214 as well. In some implementations, the map does not display the locations of individual participating devices in each location-sharing group. In some implementations, a user of the monitoring device can interact with the indicator of a particular location-sharing group to obtain another map (e.g., in a zoomed pop-up window, not shown) which displays the current locations of the participating devices within the particular location-sharing group.

In some implementations, location-sharing can be enabled on the group level. For example, if a first location-sharing group (e.g., Group A) has been formed between devices A1, A2, and A3, and a second location-sharing group (e.g., Group B) has been formed between devices B1, B2, and B3. The devices in Group A and the devices in Group B can consent to share their group location with one another. The consents from the devices in each group can be provided to the location-information server by the host device of the group, for example.

After the group-level location-sharing is enabled between Group A and Group B, the location of Group B as a whole can be provided to each participating device in Group A, and the location of Group A as a whole can be provided to each participating device in Group B. On each participating device of Group A, the location of Group B as a whole can be presented along with the locations of all participating devices in Group A. Similarly, on each participating device of Group B, the location of Group A as a whole can be presented along with the locations of all participating devices in Group B.

Figure 2E:
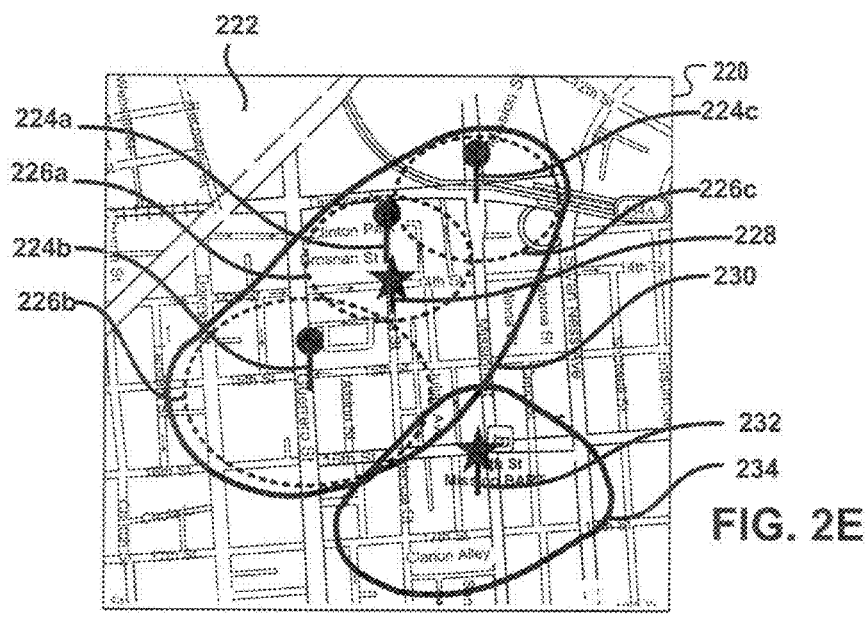

For example, as shown in FIG. 2E, on a device of Group A, a user interface 220 can be presented. The user interface 220 can include a map 222. A respective marker 224 (e.g., each of markers 224a-c) can be presented on the map 222 to represent each participating device of Group A. A respective coverage area 226 (e.g., each of area 226a-c) for each participating device can also be indicated on the map 222. A geofence 230 surrounding the devices in Group A as well as a marker (e.g., marker 228) for the location of Group A can be indicated on the map 222. In addition to the locations of all participating devices within a device's own location-sharing group, the user interface 220 also presents a marker 232 and a geofence 234 for Group B as a whole.

Although only two or three participating devices and groups are mentioned and indicated in each of the above examples, a location-sharing group having more participating devices can be formed, and group-level location-sharing can be enabled among more than two groups.

Monitoring the Integrity of an Ad Hoc Location-Sharing Group

In some implementations, after an ad hoc location-sharing group has been formed among two or more participating devices, current locations of the participating devices can be provided to each participating device in the location-sharing group. Sometimes, each user may not be viewing the location information of the group members at all times. Therefore, it is desirable to monitor the integrity of the ad hoc location-sharing group such that an alert can be provided if one or more members are departing from the group.

For example, if a family goes to a theme park, each family member can carry a location-aware device and the whole family can form a location-sharing group. The group members can be connected with one another via one or more network connections (e.g., Bluetooth or WiFi connections) or other communication channels (e.g., short-range radio, voice, visual, or gestural communications). In some implementations, the existence of the network communication and/or other communication channels can be monitored by the current locations and the respective coverage radii of the participating devices in the group.

For example, if all members of a group are within communication range (e.g., as represented by the coverage radius) of at least one other member in the group, and each member is connect to all other members of the group either directly or via one or more other members, then the groups considered integral and complete. If however, one or more participating devices roam out of the communication range of all other members in the group, or if one or more participating devices are no longer connected to all other participating devices in the group either directly or indirectly via one or more other participating devices, then the group's integrity is considered broken. When the group integrity is broken, an alert can be generated and sent to one or more devices in the group, such as the host device, the device(s) that have departed from the rest of the group, and/or the participating devices that are still remaining with the group.

In some implementations, the location-sharing group is considered integral and complete only when all participating devices are within communication range with the host device. In some implementations, one or more beacon devices can be appointed, and the location-sharing group is considered integral and complete only when each participating device is within the communication range of at least one beacon device in the group.

In some implementations, rules and criteria for determining group integrity can be provided to the location-information server, and the location-information server can monitor the integrity of the entire group according to the rules and criteria.

When the location-information server determines that one or more participating devices have departed and/or are about to depart from the location-sharing group (e.g., according to the current locations and respective coverage radii of the participating devices, and the rules and criteria for determining group integrity), the location-information server can generated an alert to the participating devices in the group.

Figure 2F:
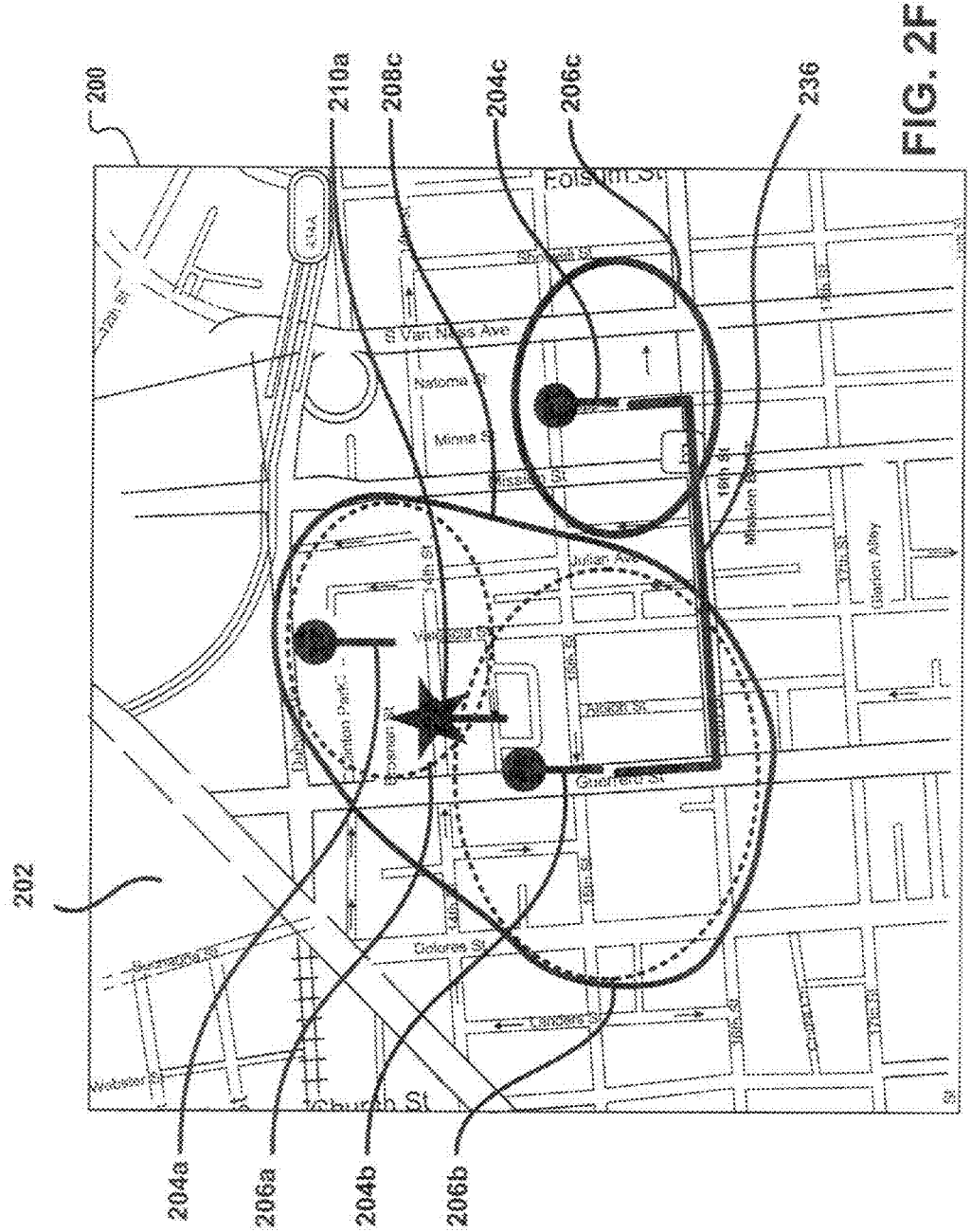
FIG. 2F is an example user interface showing a departed mobile device from a location-sharing group.

FIG. 2F illustrates that one of the participating devices (as indicated by the marker 204c) has moved to a location where the device is no longer connected to all of the other devices (as indicated by the markers 204a and 204b) in the group. As shown in FIG. 2F, the coverage area of the departing device (as indicated by the circle 206c) no longer overlaps with the coverage area of any other participating devices (as indicated by the circles 206a and 206b). In some implementations, the shape and size of the geofence 208c for the location-sharing group can be updated, so that it no longer includes the departing device (as represented by the marker 204c).

In some implementations, the alert generated by the location-information server can cause the participating devices in the location-sharing group to produce a sound, a vibration, or a popup window, for example. In some implementations, the departing device (as indicated by the marker 204c) can be highlighted in the map 202, as shown in FIG. 2F. In some implementations, the coverage area of the departing device can be indicated in the map as well (e.g., using the circle 206c).

In some implementations, the location-information server can provide a suggested route that leads the departing device back to the group, and the route can be displayed on the departing device. This suggested route can help a lost user get back on track and reconnect with the other users in the group. In some implementations, the location-information server can provide a suggested route that leads one or more remaining devices in the group to the departing device. This suggested route can help the remaining users in the group to find a lost user (e.g., a child) or a lost device (e.g., a device that is left unintentionally at a place while the owner and other users in the group have moved away from the lost device).

In some implementations, the location-information server can provide a suggested route to both the departing device and one or more other devices remaining in the group. The route can be selected by the location-information server to provide a fastest/shortest path that reconnects the departing device and a remaining device in the group. For example, as shown in FIG. 2F, a route 236 is presented on the map 202 that leads the departing device (as indicated by the marker 204c) and a remaining device (as indicated by the marker 204a) to each other.

Detecting the Proximity of a Point of Interest to the Ad Hoc Location-Sharing Group In some implementations, the location-information server can detect that the location-sharing group is in proximity of a point of interest, and can generate an alert to the devices in the location-sharing group. In some implementations, the point of interest is a stationary location, such as a coffee shop, a tourist destination, and so on. In some implementations, the point of interest is another device that is not currently participating in the location-sharing group. When the location-sharing group and the device of interest are found to be in proximity of each other (e.g., due to the movement of the group, the device of interest, or both), an alert can be provided to the devices in the location-sharing group.

In some scenarios, it is desirable for the users of the participating devices to know when a location of interest is near the group as a whole. The group members can decide whether to make that location of interest a destination and meet there. For example, when a family is in a theme park, the family members can form a location-sharing group. Each family member can be at a slight different location in the park from the other family members, but the all family members are connected to one another via one or more communication means (e.g., Bluetooth, gestural, and/or radio communications, etc.). When the group as a whole comes near an interesting ride, an alert can be generated by the location-information server and presented on each device in the group. The family as a whole can decide whether to go to that ride together. In some implementations, the location-information server can provide a vote button on the user interface of each device for each family member to cast a vote on this ride, and tally the votes from all family members.

In some implementations, the group members can specify the criteria for determine what location qualifies as a location of interest. For example, the group members can specify a general category for the location of interest, such as coffee shops, restaurants, gas stations, art museums, theme park rides, and so on. For another example, the group members can further specify other criteria for selecting particular entities within the category to be a location of interest, such as a rating, a particular brand, a price range, and so on.

In some scenarios, it is desirable for members of a location-sharing group to know whether a particular device of interest is nearby. In some implementations, the members can specify the criteria for determining whether a device qualifies as a device of interest. When the location-information server determines that a device of interest is near the location-sharing group, either due to the movement of the group, the device of interest, or both, the location-information server can provide an alert to the devices in the group.

In an example scenario, a secured zone around several key personnel can be established while they work on a highly confidential project. A location-sharing group can be established for these key personnel, so that they can be updated with the locations of other key personnel at all times. If a person that does not belong to the group (e.g., a janitorial staff) is found to be near the group, the location-information server can provide an alert to the key personnel in the group, so that they can take necessary measures to protect their confidential work while the outsider is nearby.

In another example scenario, a family goes to a theme park and the family forms a location-sharing group. The family can specify to the location-information server that they would like to be notified when an ice cream vendor is nearby. Suppose the ice cream vendors in the park all carry a location-aware device that is tracked by the location-information server. When an ice cream vendor is detected near the group as a whole, either due to the movement of the ice cream vendor, the family as a whole, or both, the location information server can send an alert to the devices in the group.

In some implementations, the criteria for determining whether a device qualifies as a device of interest can be provided by the members of the location-sharing group. For example, the members of the location-sharing group can specify a type of device (e.g., a WiFi device in a WiFi prohibited zone), a user or device identifier associated with the device (e.g., user ID, IP address, etc), or any type of device that does not satisfy particular criteria (e.g., an unknown device, a device that does not have the necessary credentials, etc.) to qualify as a device of interest. In some implementations, specific criteria for identifying a device of interest can be specified by the location-information server, and the location-sharing group can provide consent to accept the alert from the location-information server for such devices of interest.

Once the location-information server knows the criteria to determine whether a location is a location of interest, or whether a particular device is a device of interest to a particular location-sharing group, the location-information server can proceed to determine whether the location of interest or device of interest is near the group as a whole. In some implementations, the location information server makes such determination based on the geofence of the location-sharing group. If the location-of-interest or the device of interest has crossed and entered the geofence of the location-sharing group, then the point of interest is determined to be near the location-sharing group as a whole, and an alert can be generated by the location-information server.

Figure 2G:
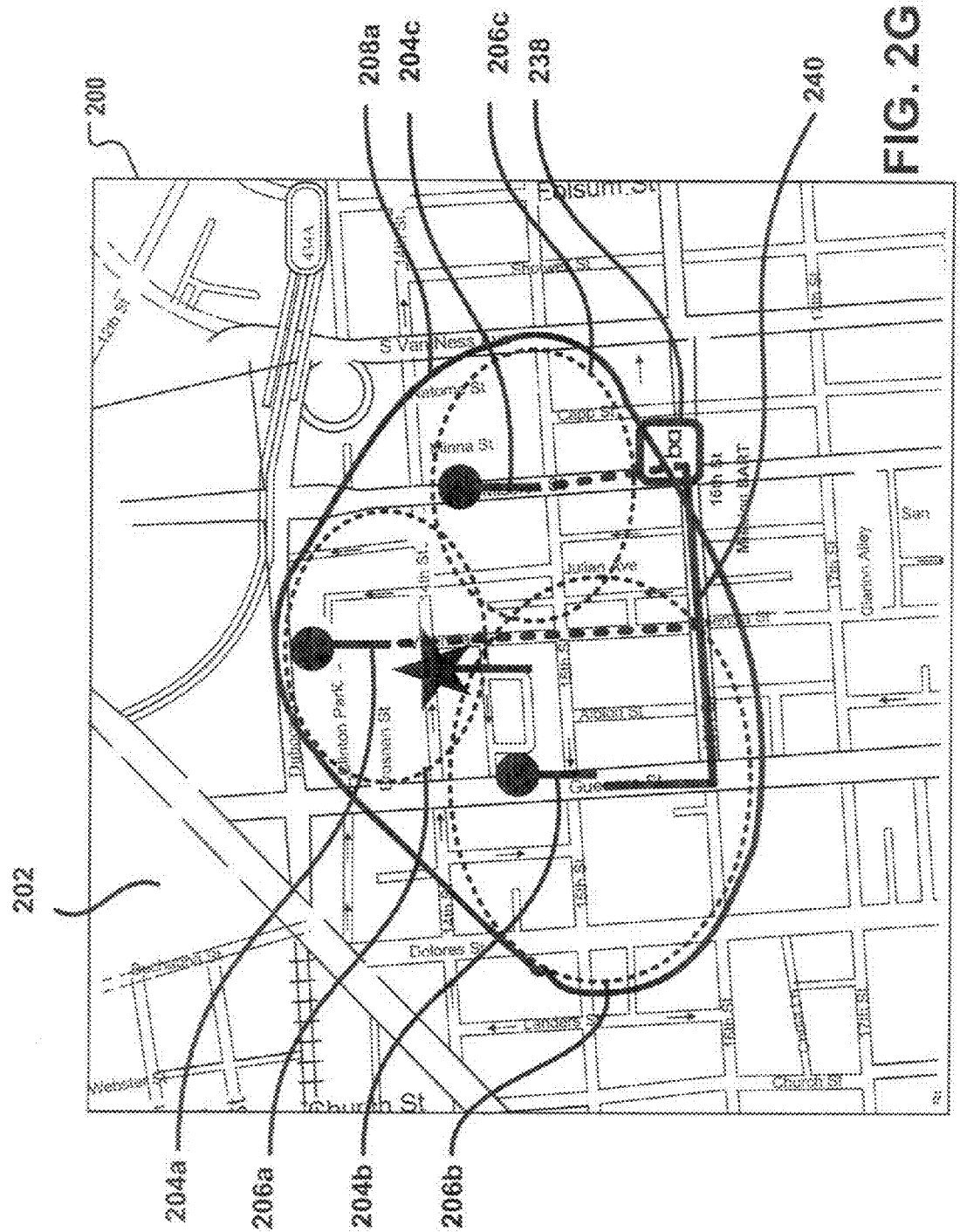
FIG. 2G is an example user interface showing an alert for a point of interest near the location-sharing group.

As shown in FIG. 2G, a user interface 200 presents a map 202 showing the current locations of three participating devices (as indicated by the markers 204a-c) in a location-sharing group. The geofence 208a is indicated around the markers 204a-c. Suppose that the group has provided a criterion that says public transportation stations qualifies a point of interest. When the group as a whole moves and a public transit station (as indicated by icon 238) crosses and enters the geofence 208a, the location information server can generate an alert and provide the alert to each participating devices in the group. The alert can be a flashing or highlighted icon 238, accompanied by a sound, for example.

In some implementations, the location information server can provide suggested route for each device that leads from the current location of the device to the point of interest. For example, as shown in FIG. 2G, a route 240 is presented on the user interface 200 leading device represented by the marker 204a to the point of interest. In some implementations, suggested routes for other members in the group can also be provided on the device (e.g., as shown by the dashed lines in FIG. 2G).

Example Processes for Tracking and Sharing Locations of Location-Sharing Groups

Figure 3:
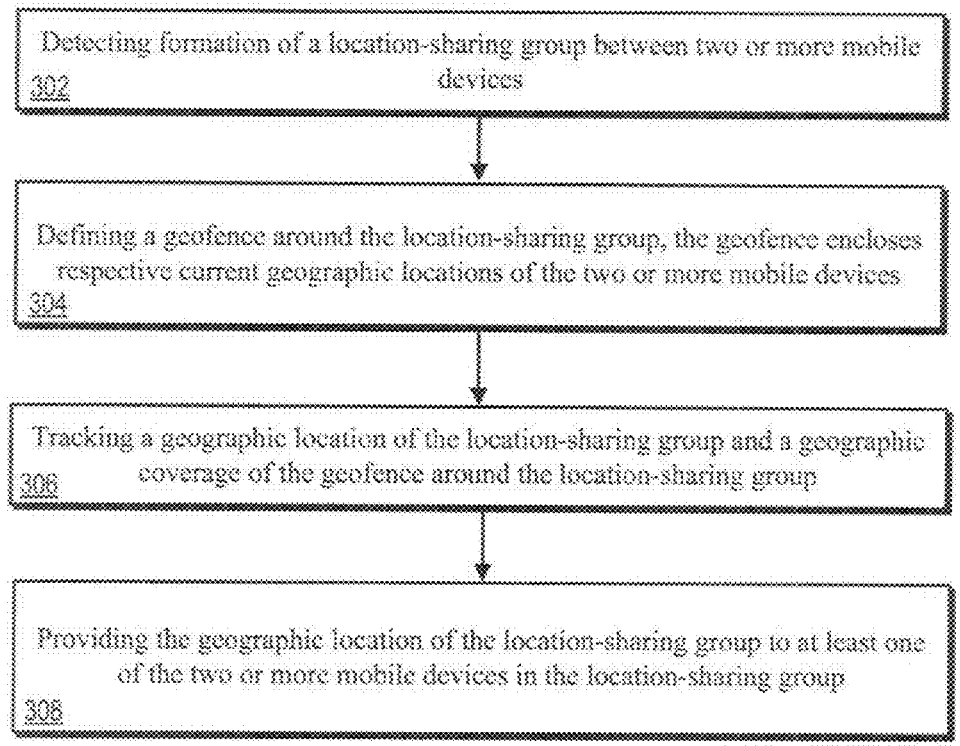
FIG. 3 is a flow diagram of an example process for tracking and providing the location of an ad hoc location-sharing group.

FIG. 3 is a flow diagram of an example process 300 for tracking and providing the location of an ad hoc location-sharing group. The example process 300 can be performed by a location-information server, for example. Details of the process 300 can be found in FIGS. 1-2 and the accompanying descriptions. In some implementations, the process 300 starts when the formation of a location-sharing group between two or more mobile devices is detected by the location-information server (302). After the location-sharing group is formed, a geofence around the location-sharing group can be defined, where the geofence encloses respective current geographic locations of the two or more mobile devices (304). Then, the geographic location of the location-sharing group and a geographic coverage of the geofence around the location-sharing group can be tracked in real-time (306). Then, the geographic location of the location-sharing group can be provided to at least one of the two or more mobile devices in the location-sharing group (308).

Figure 4A:
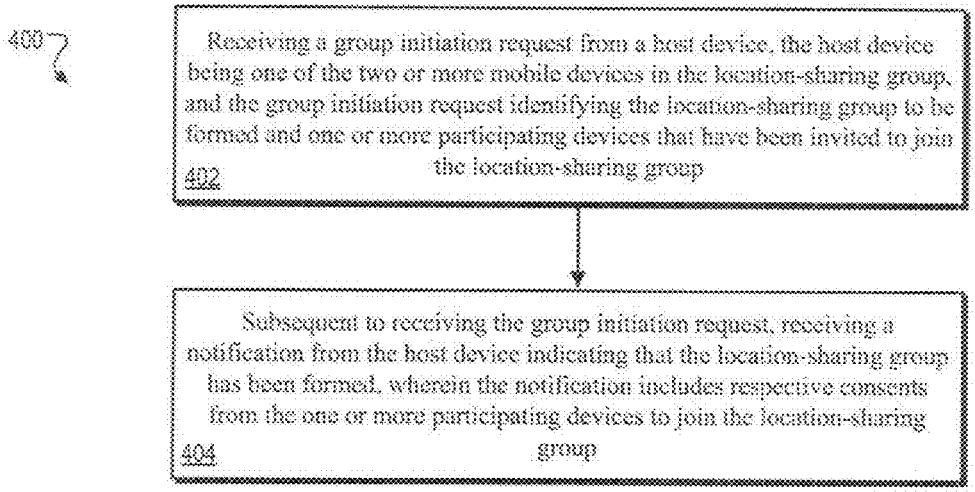
FIGS. 4A and 4B are each a flow diagram of an example process for detecting the formation of an ad hoc location-sharing group.

FIG. 4A is a flow diagram of an example process 400 for detecting the formation of a location-sharing group. The process 400 starts when a group initiation request is received from a host device (402), where the host device is one of the two or more mobile devices in the location-sharing group, and the group initiation request identifies the location-sharing group to be formed and one or more participating devices that have been invited to join the location-sharing group. Subsequent to the group initiation request being received, a notification from the host device indicating that the location-sharing group has been formed can be received (404), where the notification includes respective consents from the one or more participating devices to join the location-sharing group.

Figure 4B:
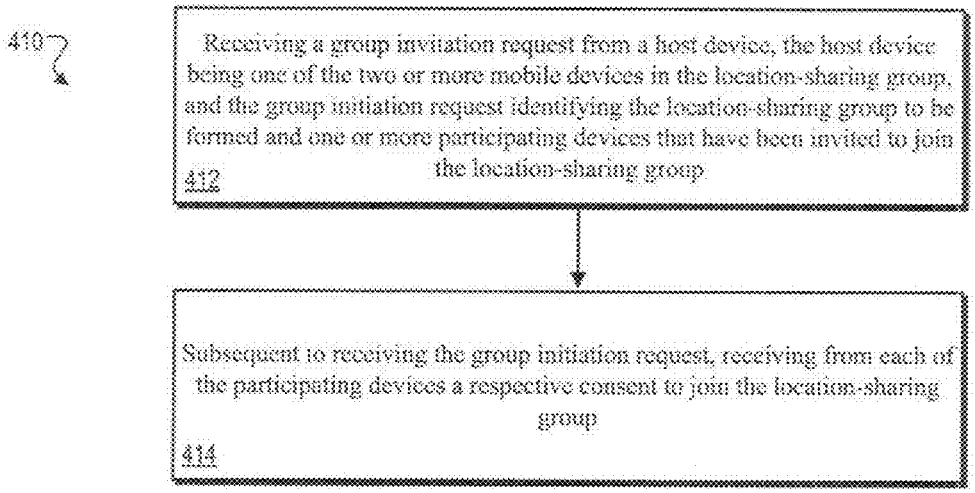

FIG. 4B is a flow diagram of another example process 410 for detecting the formation of a location-sharing group. The process 410 starts when a group invitation request is received from a host device (412), where the host device is one of the two or more mobile devices in the location-sharing group, and the group initiation request identifies the location-sharing group to be formed and one or more participating devices that have been invited to join the location-sharing group. Subsequent to the group initiation request being received, a respective consent to join the location-sharing group can be received from each of the participating devices (414).

In some implementations, the location-sharing group is supported by one or more active network connections between the two or more mobile devices. In some implementations, the one or more network connections include one or more of a Bluetooth network connection or a WiFi network connection.

Figure 5:
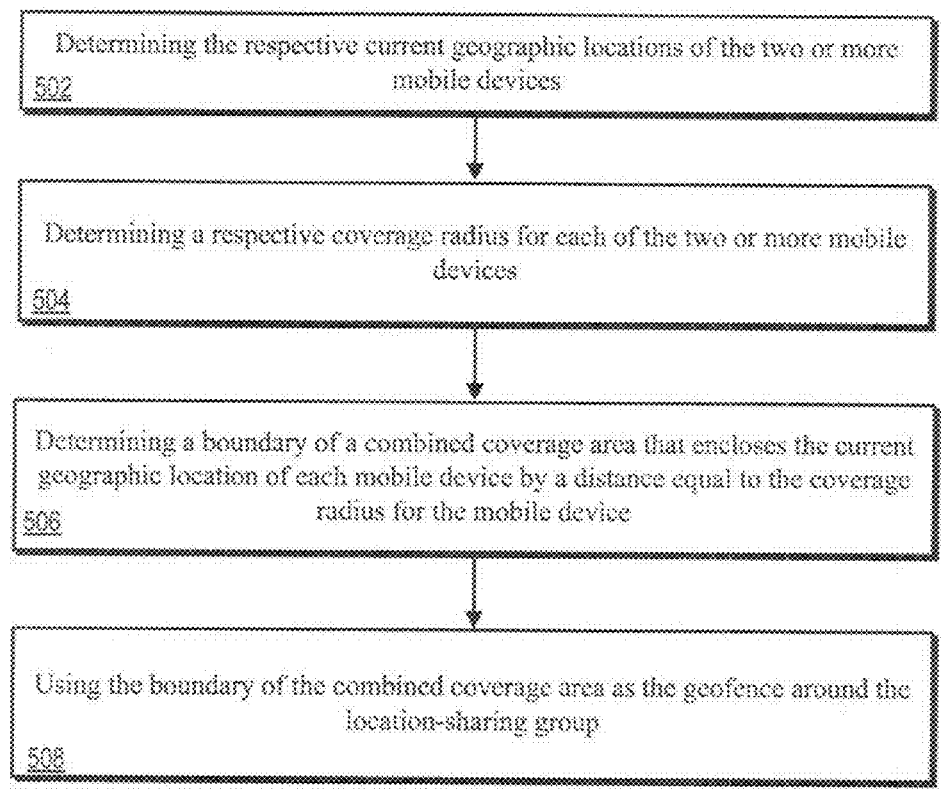
FIG. 5 is a flow diagram of an example process for defining a geofence around the ad hoc location-sharing group.

FIG. 5 is a flow diagram of an example process 500 for defining a geofence around the location-sharing group. The process 500 starts when the respective current geographic locations of the two or more mobile devices are determined (502). A respective coverage radius is also determined for each of the two or more mobile devices (504). Then, a boundary of a combined coverage area that encloses the current geographic location of each mobile device by a distance equal to the coverage radius for the mobile device can be determined (506). Then, the boundary of the combined coverage area can be used as the geofence around the location-sharing group (508).

In some implementations, in order to determine the respective coverage radius for each of the two or more mobile devices, a connection type for a network connection presently established between the mobile device and another mobile device in the location-sharing group is determined. Then, a known connectivity range for the connection type can be used as the coverage radius for the mobile device.

In some implementations, to determine the coverage radius for each of the two or more mobile devices, the coverage radius is received from the mobile device, and the coverage radius is a user-specified distance.

Figure 6:
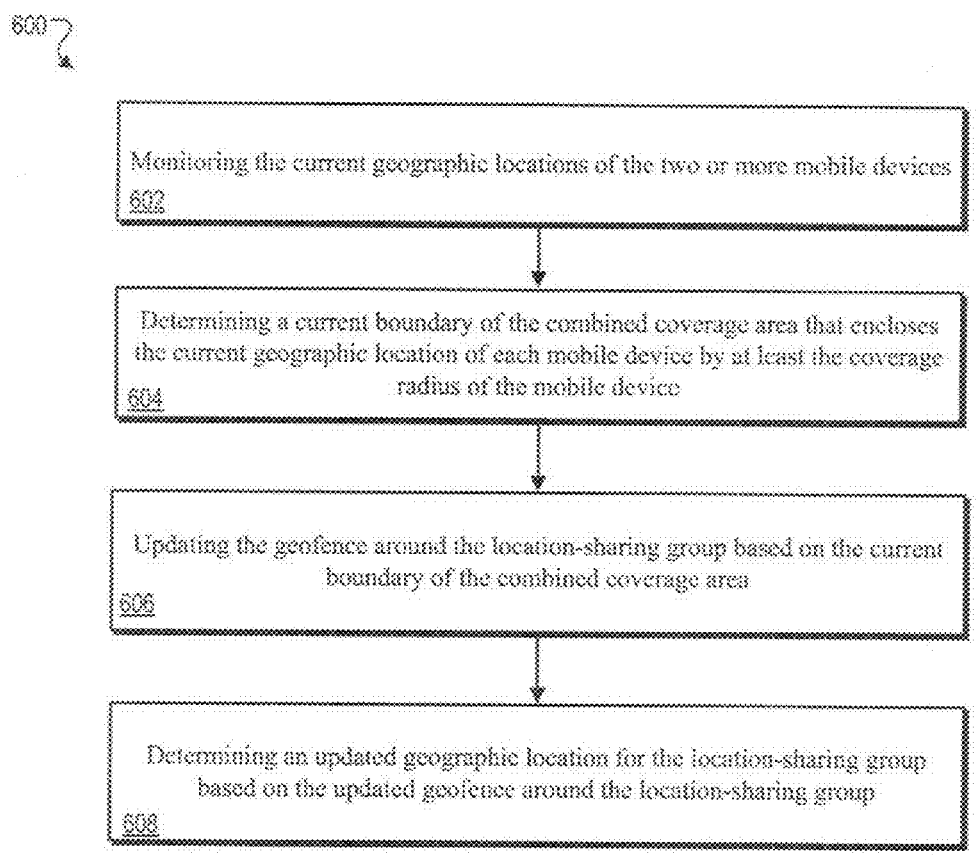
FIG. 6 is a flow diagram of an example process for monitoring the location and the geofence of the location-sharing group.

FIG. 6 is a flow diagram of an example process 600 for tracking the geographic location of the location-sharing group and a geographic coverage of the geofence around the location-sharing group. In the example process 600, the current geographic locations of the two or more mobile devices are monitored (602). A current boundary of the combined coverage area that encloses the current geographic location of each mobile device by at least the coverage radius of the mobile device can be determined (604). The geofence around the location-sharing group can be updated based on the current boundary of the combined coverage area (606). Then, an updated geographic location for the location-sharing group can be determined based on the updated geofence around the location-sharing group (608).

In some implementations, the geographic location of the location-sharing group is determined based on a geometric center of the geofence around the location-sharing group.

Figure 7:
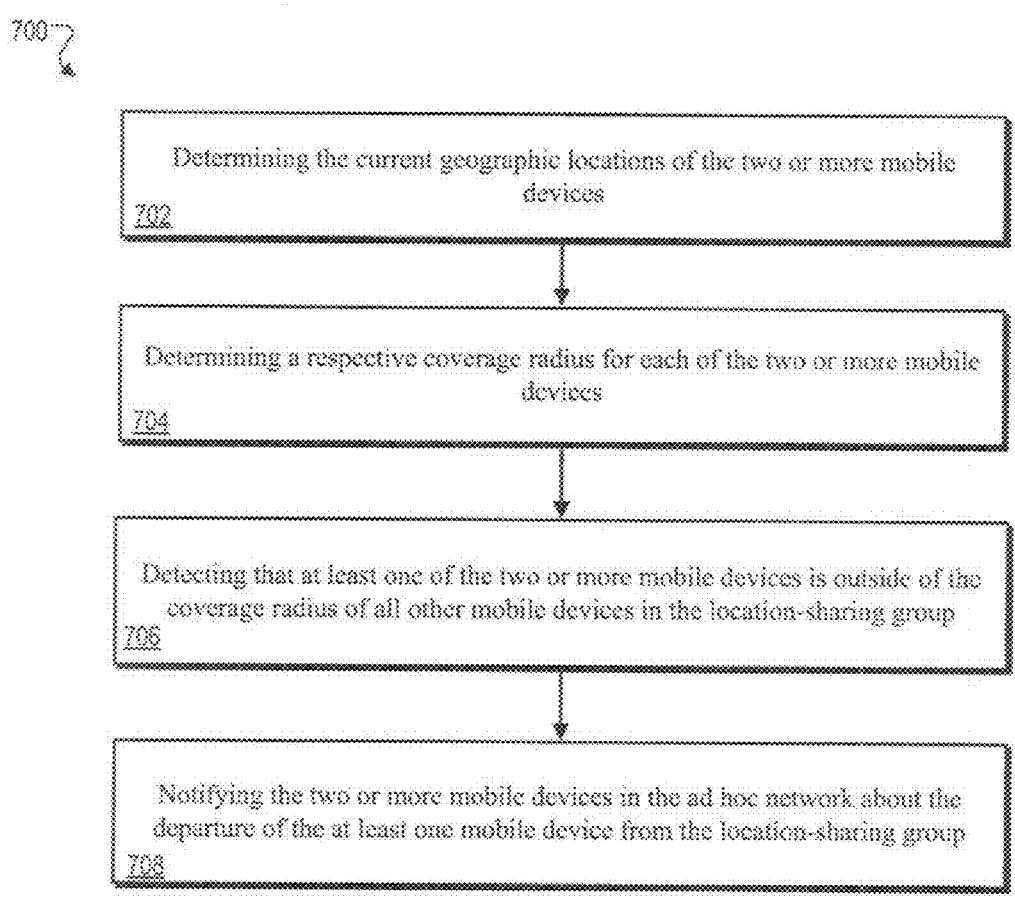
FIG. 7 is a flow diagram of an example process for detecting the departure of a participating device from the location-sharing group.

FIG. 7 is a flow diagram of an example process 700 for detecting the departure of a participating device from the location-sharing group. In the example process 700, the current geographic locations of the two or more mobile devices can be determined (702). A respective coverage radius for each of the two or more mobile devices can also be determined (704). Then, it is detected (e.g., by the location-information server) that at least one of the two or more mobile devices is outside of the coverage radius of all other mobile devices in the location-sharing group (706). Then, the two or more mobile devices in the ad hoc network are notified about the departure of the at least one mobile device from the location-sharing group (708).

In some implementations, the geographic location and geofence of the location-sharing group are based on the mobile devices that are currently participating in the location-sharing group. In some implementations, a suggested route can be provided for the departed mobile device to rejoin the location-sharing group. In some implementations, a suggested route can be provided to at least one of the mobile devices currently participating in the location-sharing group to recapture the departed mobile device.

In some implementations, the location-information server can detect that a point of interest has crossed and entered the geofence of a location-sharing group. The location-information server can provide a notification to at least one of the two or more devices about the point of interest.

Figure 8:
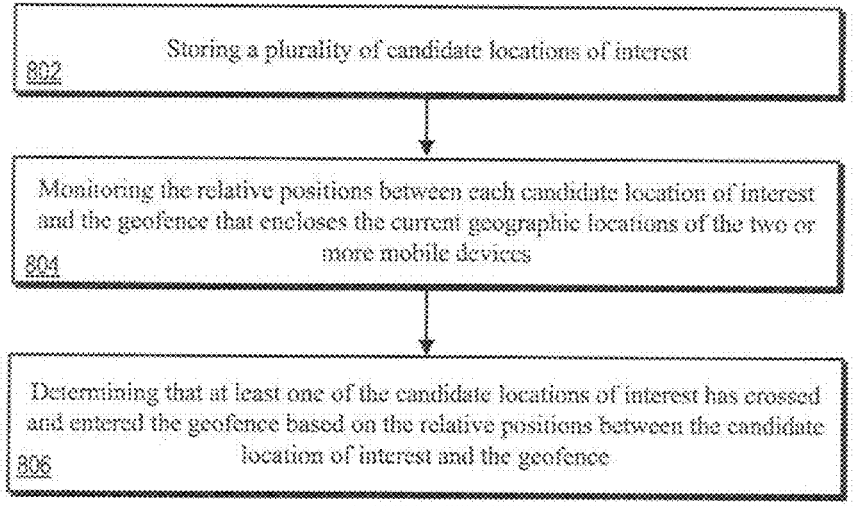
FIG. 8 is a flow diagram of an example process for detecting the entry of a location of interest into the geofence of the location-sharing group.

FIG. 8 is a flow diagram of an example process 800 for detecting the entry of a location of interest into the geofence of the location-sharing group. In the example process 800, a plurality of candidate locations of interest can be stored (e.g., at the location-information server) (802). The relative positions between each candidate location of interest and the geofence that encloses the current geographic locations of the two or more mobile devices can be monitored (804). Then, it can be determined that at least one of the candidate locations of interest has crossed and entered the geofence based on the relative positions between the candidate location of interest and the geofence (806). Then, the location-information server can provide a notification to at least one of the two or more devices about the candidate location of interest that has crossed and entered the geofence.

Figure 9:
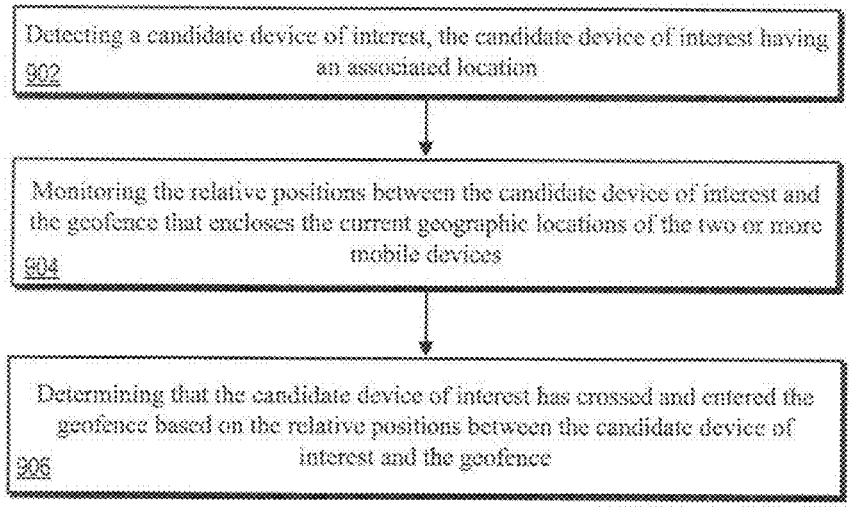
FIG. 9 is a flow diagram of an example process for detecting the entry of a device of interest into the geofence of the location-sharing group.

FIG. 9 is a flow diagram of an example process 900 for detecting the entry of a device of interest into the geofence around the location-sharing group. In the example process 900, a candidate device of interest can be detected, where the candidate device of interest has an associated location (902). The relative positions between the candidate device of interest and the geofence that encloses the current geographic locations of the two or more mobile devices can be monitored (904). Then, it can be determined (e.g., by the location-information server) that the candidate device of interest has crossed and entered the geofence based on the relative positions between the candidate device of interest and the geofence (906). Then, the location-information server can provide a notification to at least one of the two or more devices about the candidate device of interest that has crossed and entered the geofence.

Other processes can be implemented, such as those described with respect to FIGS. 1-2.

Example Mobile Device

Figure 10:
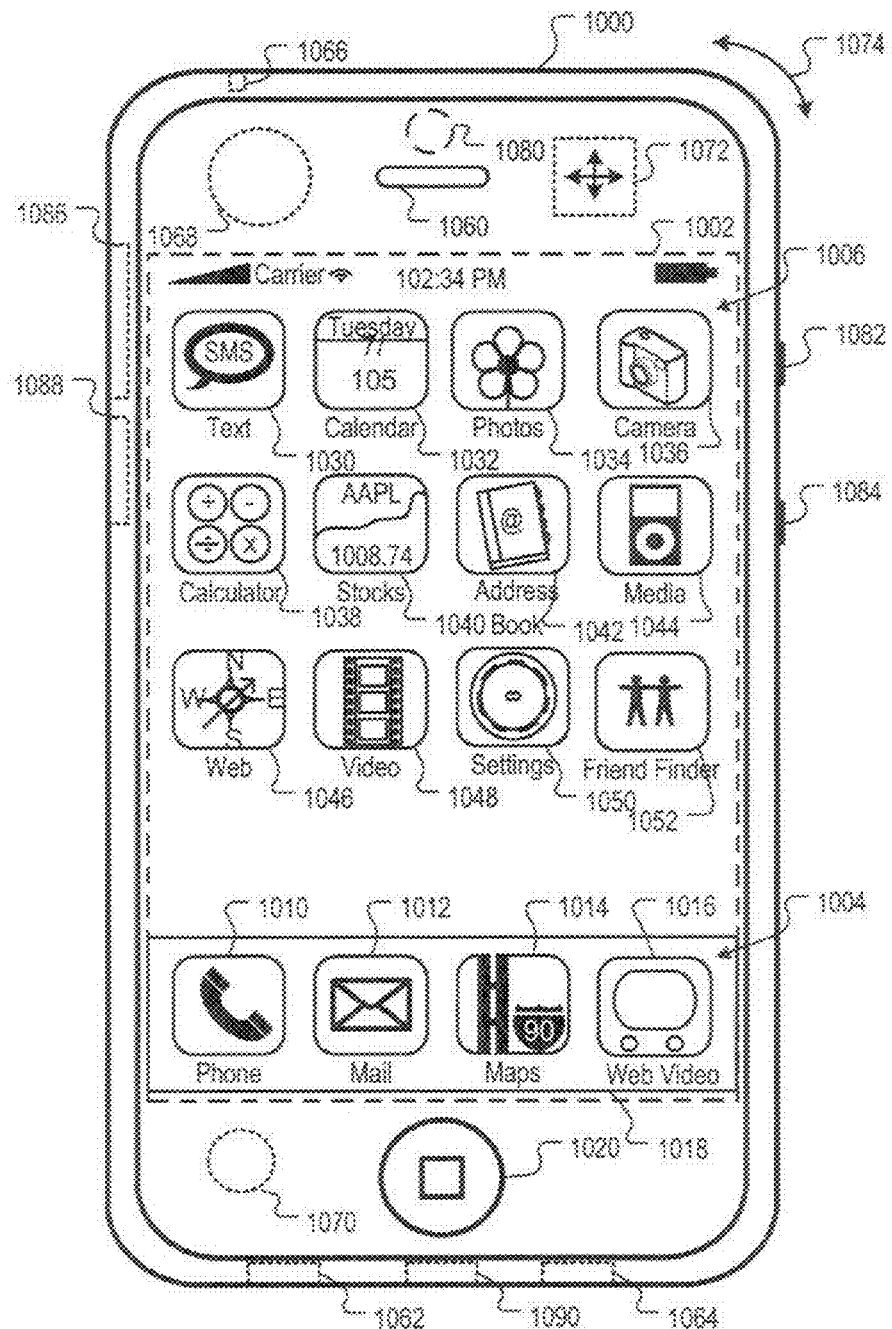
FIG. 10 is an example location-aware mobile device.

FIG. 10 is a block diagram of example mobile device 1000. The mobile device 1000 can be, for example, a handheld computer, a personal digital assistant (PDA), a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 1000 includes touch-sensitive display 1002. The touch-sensitive display 1002 can be implemented with liquid crystal display (LCD) technology, light emitting polymer display (LPD) technology, or some other display technology. The touch-sensitive display 1002 can be sensitive to haptic and/or tactile contact with a user.

In some implementations, the touch-sensitive display 1002 can comprise multi-touch-sensitive display 1002. The multi-touch-sensitive display 1002 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 1000 can display one or more graphical user interfaces on the touch-sensitive display 1002 for providing the user access to various system objects and for conveying information to the user. In some implementations, the graphical user interface can include one or more display objects 1004, 1006. In the example shown, the display objects 1004, 1006, are graphic representations of system objects. Some examples of system objects include device functions, applications, windows, files, alerts, events, or other identifiable system objects.

Example Mobile Device Functionality

In some implementations, the mobile device 1000 can implement multiple device functionalities, such as a telephony device, as indicated by phone object 1010; an e-mail device, as indicated by e-mail object 1012; a map devices, as indicated by Maps object 1014; a Wi-Fi base station device (not shown); and a network video transmission and display device, as indicated by Web Video object 1016. In some implementations, particular display objects 1004, e.g., the phone object 1010, the e-mail object 1012, the Maps object 1014, and the Web Video object 1016, can be displayed in menu bar 1018. In some implementations, device functionalities can be accessed from a top-level graphical user interface, such as the graphical user interface illustrated in FIG. 10. Touching one of the objects 1010, 1012, 1014, or 1016 can, for example, invoke corresponding functionality.

In some implementations, the mobile device 1000 can implement network distribution functionality. For example, the functionality can enable the user to take the mobile device 1000 and provide access to its associated network while traveling. In particular, the mobile device 1000 can extend Internet access (e.g., Wi-Fi) to other wireless devices in the vicinity. For example, the mobile device 1000 can be configured as a base station for one or more devices. As such, the mobile device 1000 can grant or deny network access to other wireless devices.

In some implementations, upon invocation of device functionality, the graphical user interface of the mobile device 1000 changes, or is augmented or replaced with another user interface or user interface elements, to facilitate user access to particular functions associated with the corresponding device functionality. For example, in response to a user touching the phone object 1010, the graphical user interface of the touch-sensitive display 1002 may present display objects related to various phone functions; likewise, touching of the email object 1012 may cause the graphical user interface to present display objects related to various e-mail functions; touching the Maps object 1014 may cause the graphical user interface to present display objects related to various maps functions; and touching the media player object 1016 may cause the graphical user interface to present display objects related to various web video functions.

In some implementations, the top-level graphical user interface environment or state of FIG. 10 can be restored by pressing button 1020 located near the bottom of the mobile device 1000. In some implementations, each corresponding device functionality may have corresponding "home" display objects displayed on the touch-sensitive display 1002, and the graphical user interface environment of FIG. 10 can be restored by pressing the "home" display object.

In some implementations, the top-level graphical user interface can include additional display objects 1006, such as short messaging service (SMS) object 1030, calendar object 1032, photos object 1034, camera object 1036, calculator object 1038, stocks object 1040, address book object 1042, media player object 1044, Web object 1046, video object 1048, settings object 1050. Touching the SMS display object 1030 can, for example, invoke an SMS messaging environment and supporting functionality; likewise, each selection of a display object 1032, 1034, 1036, 1038, 1040, 1042, 1044, 1046, 1048, and 1050 can invoke a corresponding object environment and functionality.

In some implementations, the top-level graphical user interface can include display object 1052 for a dedicated location-sharing application. The location-sharing application provides the functionalities associated with signing up for a location-sharing service, selecting other users (e.g., friends and/or contacts of the user) with whom that the user wishes to share location, and managing various aspects of location-sharing of the mobile device 1000. The mobile device 1000 can be in communication with a location information server to receive location information of other devices that are currently sharing locations with the mobile device 1000. The mobile device 1000 can also be in communication with the location information server to provide its own location to the location information server.

Additional and/or different display objects can also be displayed in the graphical user interface of FIG. 10. For example, if the device 1000 is functioning as a base station for other devices, one or more "connection" objects may appear in the graphical user interface to indicate the connection. In some implementations, the display objects 1006 can be configured by a user, e.g., a user may specify which display objects 1006 are displayed, and/or may download additional applications or other software that provides other functionalities and corresponding display objects.

In some implementations, the mobile device 1000 can include one or more input/output (I/O) devices and/or sensor devices. For example, speaker 1060 and microphone 1062 can be included to facilitate voice-enabled functionalities, such as phone and voice mail functions. In some implementations, up/down button 1084 for volume control of the speaker 1060 and the microphone 1062 can be included. The mobile device 1000 can also include on/off button 1082 for a ring indicator of incoming phone calls. In some implementations, loud speaker 1064 can be included to facilitate hands-free voice functionalities, such as speaker phone functions. Audio jack 1066 can also be included for use of headphones and/or a microphone.

In some implementations, proximity sensor 1068 can be included to facilitate the detection of the user positioning the mobile device 1000 proximate to the user's ear and, in response, to disengage the touch-sensitive display 1002 to prevent accidental function invocations. In some implementations, the touch-sensitive display 1002 can be turned off to conserve additional power when the mobile device 1000 is proximate to the user's ear.

Other sensors can also be used. For example, in some implementations, ambient light sensor 1070 can be utilized to facilitate adjusting the brightness of the touch-sensitive display 1002. In some implementations, accelerometer 1072 can be utilized to detect movement of the mobile device 1000, as indicated by directional arrow 1074. Accordingly, display objects and/or media can be presented according to a detected orientation, e.g., portrait or landscape.

In some implementations, the mobile device 1000 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 1000 or provided as a separate device that is coupled to the mobile device 1000 through an interface (e.g., port device 1090) to provide access to location-based services.

In some implementations, the port device 1090, e.g., a Universal Serial Bus (USB) port, or a docking port, or some other wired port connection, can be included. The port device 1090 can, for example, be utilized to establish a wired connection to other computing devices, such as other communication devices, network access devices, a personal computer, a printer, a display screen, or other processing devices capable of receiving and/or transmitting data. In some implementations, the port device 1090 allows the mobile device 1000 to synchronize with a host device using one or more protocols, such as, for example, the TCP/IP, HTTP, UDP and any other known protocol.

The mobile device 1000 can also include camera lens and sensor 1080. In some implementations, the camera lens and sensor 1080 can be located on the back surface of the mobile device 1000. The camera can capture still images and/or video.

The mobile device 1000 can also include one or more wireless communication subsystems, such as 802.1010b/g communication device 1086, and/or Bluetooth™ communication device 1088. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Example Network Operating Environment

Figure 11:
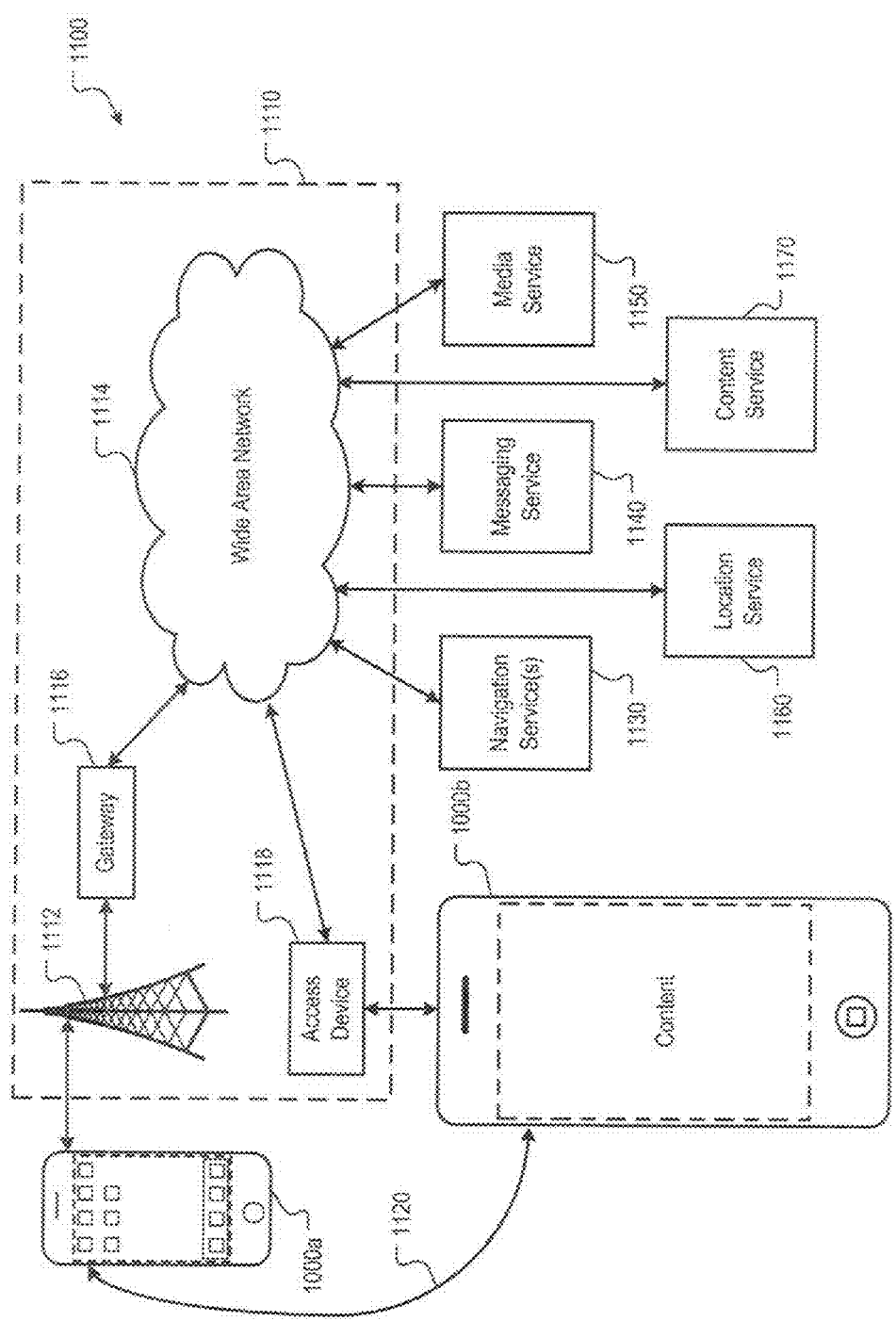
FIG. 11 is a block diagram of an example mobile device operating environment.

FIG. 11 is a block diagram 1100 of an example of a mobile device operating environment. The mobile device 1000 of FIG. 10 (shown as 1000a or 1000b here) can, for example, communicate over one or more wired and/or wireless networks 1110 in data communication. For example, wireless network 1112 (e.g., a cellular network), can communicate with wide area network (WAN) 1114, such as the Internet, by use of gateway 1116. Likewise, access point 1118, such as an 802.11g wireless access point, can provide communication access to the wide area network 1114. In some implementations, both voice and data communications can be established over the wireless network 1112 and the access point 1118. For example, the mobile device 1000a can place and receive phone calls (e.g., using VoIP protocols), send and receive e-mail messages (e.g., using POP3 protocol), and retrieve electronic documents and/or streams, such as web pages, photographs, and videos, over the wireless network 1112, gateway 1116, and wide area network 1114 (e.g., using TCP/IP or UDP protocols). Likewise, the mobile device 1000b can place and receive phone calls, send and receive e-mail messages, and retrieve electronic documents over the access point 1118 and the wide area network 1114. In some implementations, the mobile device 1000b can be physically connected to the access point 1118 using one or more cables and the access point 1118 can be a personal computer. In this configuration, the mobile device 1000 can be referred to as a "tethered" device.

The mobile devices 1000a and 1000b can also establish communications by other means (e.g., wireless communications). For example, the mobile device 1000a can communicate with other mobile devices (e.g., other wireless devices, cell phones, etc.), over the wireless network 1112. Likewise, the mobile devices 1000a and 1000b can establish peer-to-peer communications 1120 (e.g., a personal area network), by use of one or more communication subsystems (e.g., a Bluetooth™ communication device). Other communication protocols and topologies can also be implemented.

The mobile device 1000a or 1000b can, for example, communicate with one or more services 1130, 1140, 1150, 1160, and 1170 over the one or more wired and/or wireless networks 1110. For example, navigation service 1130 can provide navigation information (e.g., map information, location information, route information, and other information), to the mobile device 1000a or 1000b. Access to a service can be provided by invocation of an appropriate application or functionality on the mobile device. For example, to invoke the navigation service 1130, a user can invoke a Maps function or application by touching the Maps object 1014 depicted in FIG. 10. Messaging service 1140 can, for example, provide e-mail and/or other messaging services. Media service 1150 can, for example, provide access to media files, such as song files, movie files, video clips, and other media data. Location service 1160 can, for example, perform location-sharing services as described in this specification. Content service 1170 can, for example, provide access to content publishers such as news sites, RSS feeds, web sites, blogs, social networking sites, developer networks, etc. Other services can also be provided, including a software update service that automatically determines whether software updates exist for software on the mobile device, then downloads the software updates to the mobile device where it can be manually or automatically unpacked and/or installed. Other services such as location-sharing services can also be provided.

Example Mobile Device Architecture

Figure 12:
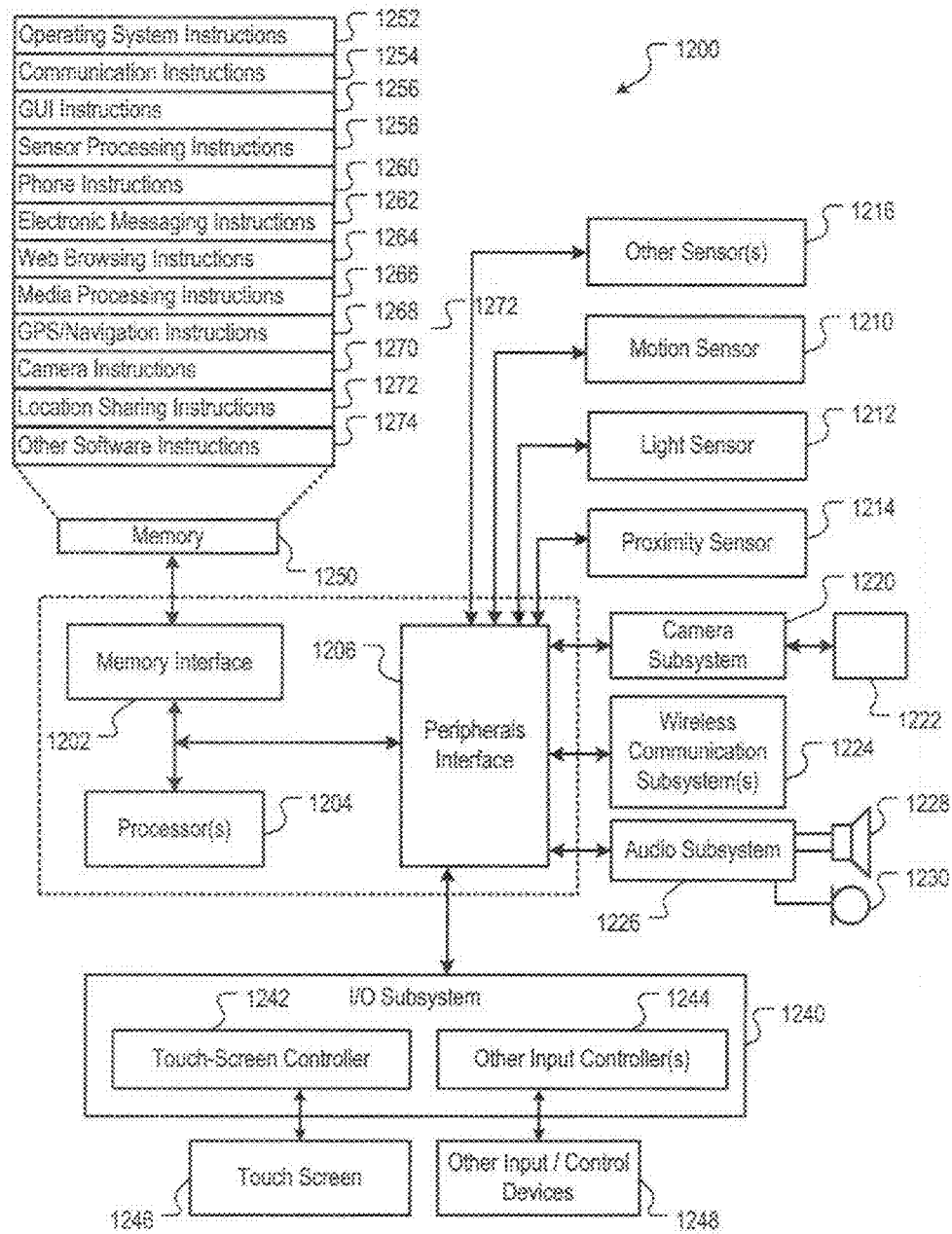
FIG. 12 is a block diagram of an example implementation of the mobile device of FIG. 1.

FIG. 12 is a block diagram 1200 of an example implementation of the mobile device 1000 of FIG. 10. The mobile device 1000 can include memory interface 1202, one or more data processors, image processors and/or central processing units 1204, and peripherals interface 1206. The memory interface 1202, the one or more processors 1204 and/or the peripherals interface 1206 can be separate components or can be integrated in one or more integrated circuits. The various components in the mobile device 1000 can be coupled by one or more communication buses or signal lines.

Sensors, devices, and subsystems can be coupled to the peripherals interface 1206 to facilitate multiple functionalities. For example, motion sensor 1210, light sensor 1212, and proximity sensor 1214 can be coupled to the peripherals interface 1206 to facilitate orientation, lighting, and proximity functions. Other sensors 1216 can also be connected to the peripherals interface 1206, such as a positioning system (e.g., GPS receiver), a temperature sensor, a biometric sensor, or other sensing device, to facilitate related functionalities.

Camera subsystem 1220 and optical sensor 1222 (e.g., a charged coupled device (CCD) or a complementary metal-oxide semiconductor (CMOS) optical sensor), can be utilized to facilitate camera functions, such as recording photographs and video clips.

Communication functions can be facilitated through one or more wireless communication subsystems 1224, which can include radio frequency receivers and transmitters and/or optical (e.g., infrared) receivers and transmitters. The specific design and implementation of the communication subsystem 1224 can depend on the communication network(s) over which the mobile device 100 is intended to operate. For example, a mobile device 1000 may include communication subsystems 1224 designed to operate over a GSM network, a GPRS network, an EDGE network, a Wi-Fi or WiMax network, and a Bluetooth™ network. In particular, the wireless communication subsystems 1824 may include hosting protocols such that the device 1000 may be configured as a base station for other wireless devices.

Audio subsystem 1226 can be coupled to speaker 1228 and microphone 1230 to facilitate voice-enabled functions, such as voice recognition, voice replication, digital recording, and telephony functions.

The I/O subsystem 1240 can include touch screen controller 1242 and/or other input controller(s) 1244. The touch-screen controller 1242 can be coupled to touch screen 1246. The touch screen 1246 and touch screen controller 1242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 1246.

The other input controller(s) 1244 can be coupled to other input/control devices 1248, such as one or more buttons, rocker switches, thumb-wheel, infrared port, USB port, and/or a pointer device such as a stylus. The one or more buttons (not shown) can include an up/down button for volume control of the speaker 1228 and/or the microphone 1230.

In one implementation, a pressing of the button for a first duration may disengage a lock of the touch screen 1246; and a pressing of the button for a second duration that is longer than the first duration may turn power to the mobile device 1000 on or off. The user may be able to customize a functionality of one or more of the buttons. The touch screen 1246 can, for example, also be used to implement virtual or soft buttons and/or a keypad or keyboard.

In some implementations, the mobile device 1000 can present recorded audio and/or video files, such as MP3, AAC, and MPEG files. In some implementations, the mobile device 1000 can include the functionality of an MP3 player, such as an iPod™. The mobile device 1000 may, therefore, include a 30-pin dock connector that is compatible with the iPod. Other input/output and control devices can also be used.

The memory interface 1202 can be coupled to memory 1250. The memory 1250 can include high-speed random access memory and/or non-volatile memory, such as one or more magnetic disk storage devices, one or more optical storage devices, and/or flash memory (e.g., NAND, NOR). The memory 1250 can store an operating system 1252, such as Darwin, RTXC, LINUX, UNIX, OS X, WINDOWS, or an embedded operating system such as VxWorks. The operating system 1252 may include instructions for handling basic system services and for performing hardware dependent tasks.

The memory 1250 may also store communication instructions 1254 to facilitate communicating with one or more additional devices, one or more computers and/or one or more servers. The memory 1250 may include graphical user interface instructions 1256 to facilitate graphic user interface processing. For example, the graphical user interfaces described with respect to FIGS. 2A-2G can be implemented with graphic user interface instructions 1256. The memory 1250 may also include sensor processing instructions 1258 to facilitate sensor-related processing and functions; phone instructions 1260 to facilitate phone-related processes and functions; electronic messaging instructions 1262 to facilitate electronic-messaging related processes and functions; web browsing instructions 1264 to facilitate web browsing-related processes and functions; media processing instructions 1266 to facilitate media processing-related processes and functions; GPS/Navigation instructions 1268 to facilitate GPS and navigation-related processes and instructions; camera instructions 1270 to facilitate camera-related processes and functions; location sharing instructions to facilitate the location-sharing related processes and functions; and/or other icon process instructions 1274 to facilitate processes and functions.

Each of the above identified instructions and applications can correspond to a set of instructions for performing one or more functions described above. These instructions need not be implemented as separate software programs, procedures, or modules. The memory 1250 can include additional instructions or fewer instructions. Furthermore, various functions of the mobile device 1000 may be implemented in hardware and/or in software, including in one or more signal processing and/or application specific integrated circuits.

The features described can be implemented in digital electronic circuitry, or in computer hardware, firmware, software, or in combinations of them. The features can be implemented in a computer program product tangibly embodied in an information carrier, e.g., in a machine-readable storage device or in a composition of matter capable of effecting a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
   detecting formation of a location-sharing group between two or more mobile devices, wherein the location-sharing group is identified by geographic locations of the two or more mobile devices, wherein detecting formation of the location-sharing group further comprises receiving a group initiation request from a host device, the host device being one of the two or more mobile devices in the location-sharing group, and the group initiation request identifying the location-sharing group to be formed and one or more participating devices that have been invited to join the location-sharing group by the host device;
   tracking the geographic location of the location-sharing group as locations of the two or more mobile devices change;
   providing the geographic location of the location-sharing group to at least one of the two or more mobile devices in the location-sharing group;
   determining a termination of the location-sharing group; and
   in response to determining the termination of the location-sharing group, ceasing to track the geographic location of the location-sharing group.

2. The method of claim 1, wherein detecting formation of the location-sharing group further comprises:
   subsequent to receiving the group initiation request, receiving a notification from the host device indicating that the location-sharing group has been formed, wherein the notification includes respective consents from the one or more participating devices to join the location-sharing group.

3. The method of claim 1, wherein detecting formation of the location-sharing group further comprises:
   subsequent to receiving the group initiation request, receiving from each of the participating devices a respective consent to join the location-sharing group.

4. The method of claim 1, wherein the location-sharing group is supported by one or more active network connections between the two or more mobile devices.

5. The method of claim 4, wherein the one or more network connections include one or more of a Bluetooth network connection or a WiFi network connection.

6. The method of claim 1, wherein tracking the geographic location of the location-sharing group as locations of the two or more mobile devices change comprises:
   monitoring the current geographic locations of the two or more mobile devices;
   determining a current boundary of the combined coverage area that encloses the current geographic location of each mobile device by at least the coverage radius of the mobile device; and
   determining an updated geographic location for the location-sharing group based on the current boundary.

7. The method of claim 1, wherein the location-sharing group is an ad hoc location-sharing group formed directly between the between two or more mobile devices.

8. A non-transitory computer-readable memory storing instructions executable by data processing apparatus to perform operations comprising:
   detecting formation of a location-sharing group between two or more mobile devices, wherein the location-sharing group is identified by geographic locations of the two or more mobile devices, wherein detecting formation of the location-sharing group further comprises receiving a group initiation request from a host device, the host device being one of the two or more mobile devices in the location-sharing group, and the group initiation request identifying the location-sharing group to be formed and one or more participating devices that have been invited to join the location-sharing group by the host device;
   tracking the geographic location of the location-sharing group as locations of the two or more mobile devices change;
   providing the geographic location of the location-sharing group to at least one of the two or more mobile devices in the location-sharing group;
   determining a termination of the location-sharing group; and
   in response to determining the termination of the location-sharing group, ceasing to track the geographic location of the location-sharing group.

9. The memory of claim 8, wherein the operations for detecting formation of the location-sharing group further comprises:
   subsequent to receiving the group initiation request, receiving a notification from the host device indicating that the location-sharing group has been formed, wherein the notification includes respective consents from the one or more participating devices to join the location-sharing group.

10. The memory of claim 8, wherein the operations for detecting formation of the location-sharing group further comprises:
    subsequent to receiving the group initiation request, receiving from each of the participating devices a respective consent to join the location-sharing group.

11. The memory of claim 8, wherein the location-sharing group is supported by one or more active network connections between the two or more mobile devices.

12. The memory of claim 11, wherein the one or more network connections include one or more of a Bluetooth network connection or a WiFi network connection.

13. The memory of claim 8, wherein the operations for tracking the geographic location of the location-sharing group as locations of the two or more mobile devices change comprise:

monitoring the current geographic locations of the two or more mobile devices;

determining a current boundary of the combined coverage area that encloses the current geographic location of each mobile device by at least the coverage radius of the mobile device; and determining an updated geographic location for the location-sharing group based on the current boundary.

14. The memory of claim 8, wherein the location-sharing group is an ad hoc location-sharing group formed directly between the between two or more mobile devices.

15. A system comprising:

one or more processors;

memory storing instructions executable by the one or more processors to perform operations comprising:

detecting formation of a location-sharing group between two or more mobile devices;

defining a geofence around the location-sharing group, the geofence encloses respective current geographic locations of the two or more mobile devices;

providing a geographic coverage of the geofence around the location-sharing group to at least one of the two or more mobile devices in the location-sharing group;

determining a termination of the location-sharing group; and in response to determining the termination of the location-sharing group, ceasing to track the geographic location of the location-sharing group.

16. The system of claim 15, wherein the operations for defining a geofence around the location-sharing group further comprise:

determining the respective current geographic locations of the two or more mobile devices;

determining a respective coverage radius for each of the two or more mobile devices;

determining a boundary of a combined coverage area that encloses the current geographic location of each mobile device by a distance equal to the coverage radius for the mobile device; and using the boundary of the combined coverage area as the geofence around the location-sharing group.

17. The system of claim 16, wherein the operations for determining the respective coverage radius for each of the two or more mobile devices further comprise:

determining a connection type for a network connection presently established between the mobile device and another mobile device in the location-sharing group; and using a known connectivity range for the connection type as the coverage radius for the mobile device.

18. The system of claim 16, wherein the operations for determining the coverage radius for each of the two or more mobile devices further comprise receiving the coverage radius from the mobile device, the coverage radius being a user-specified distance;

using a known connectivity range for the connection type as the coverage radius for the mobile device.

\* \* \* \* \*